US 12,169,598 B2

(12) United States Patent
Moll et al.

(10) Patent No.: US 12,169,598 B2
(45) Date of Patent: Dec. 17, 2024

(54) AR GLASSES AS IOT REMOTE CONTROL

(71) Applicants: Sharon Moll, Wetzikon (CH); Piotr Gurgul, Hergiswil (CH)

(72) Inventors: Sharon Moll, Wetzikon (CH); Piotr Gurgul, Hergiswil (CH)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/947,607

(22) Filed: Sep. 19, 2022

(65) Prior Publication Data

US 2024/0094822 A1    Mar. 21, 2024

(51) Int. Cl.
| | |
|---|---|
| *G06F 3/01* | (2006.01) |
| *G02B 27/01* | (2006.01) |
| *G06F 3/0346* | (2013.01) |
| *G06K 7/14* | (2006.01) |
| *G06T 7/50* | (2017.01) |

(Continued)

(52) U.S. Cl.
CPC ......... *G06F 3/017* (2013.01); *G02B 27/0172* (2013.01); *G06F 3/012* (2013.01); *G06F 3/0346* (2013.01); *G06T 7/50* (2017.01); *G06T 7/70* (2017.01); *G06V 20/20* (2022.01); *G02B 2027/0138* (2013.01); *G02B 2027/014* (2013.01); *G02B 2027/0178* (2013.01); *G06K 7/1417* (2013.01); *G06T 2207/30244* (2013.01); *G16Y 40/30* (2020.01)

(58) Field of Classification Search
USPC .......................................................... 345/158
See application file for complete search history.

(56) References Cited

U.S. PATENT DOCUMENTS

| | | |
|---|---|---|
| 9,858,720 B2 | 1/2018 | Da et al. |
| 10,852,838 B2 | 12/2020 | Bradski et al. |

(Continued)

FOREIGN PATENT DOCUMENTS

EP    3386204 A1    10/2018

OTHER PUBLICATIONS

International Search Report and Written Opinion for International Application No. PCT/US2023/029076, dated Nov. 15, 2023 (Nov. 15, 2023)—9 pages.

(Continued)

*Primary Examiner* — Chineyere D Wills-Burns
(74) *Attorney, Agent, or Firm* — CM Law; Stephen J. Weed

(57) ABSTRACT

AR-enabled wearable electronic devices such as smart glasses are adapted for use as an (Internet of Things) IoT remote control device where the user can control a pointer on a television screen, computer screen, or other IoT enabled device to select items by looking at them and making selections using gestures. Built-in six-degrees-of-freedom (6DoF) tracking capabilities are used to move the pointer on the screen to facilitate navigation. The display screen is tracked in real-world coordinates to determine the point of intersection of the user's view with the screen using ray-casting techniques. Hand and head gesture detection are used to allow the user to execute a variety of control actions by performing different gestures. The techniques are particularly useful for smart displays that offer AR-enhanced content that can be viewed in the displays of the AR-enabled wearable electronic devices.

19 Claims, 13 Drawing Sheets

(51) Int. Cl.
*G06T 7/70* (2017.01)
*G06V 20/20* (2022.01)
*G16Y 40/30* (2020.01)

(56) References Cited

U.S. PATENT DOCUMENTS

| | | | |
|---|---|---|---|
| 11,520,457 B1* | 12/2022 | Neves Creto | G06F 3/04812 |
| 2014/0152538 A1* | 6/2014 | Ham | G06F 3/038 |
| | | | 345/156 |
| 2014/0160002 A1 | 6/2014 | Dent | |
| 2016/0027216 A1* | 1/2016 | da Veiga | G06F 3/013 |
| | | | 345/158 |
| 2017/0061694 A1* | 3/2017 | Giraldi | G06F 3/16 |
| 2018/0032144 A1 | 2/2018 | Horowitz et al. | |
| 2018/0157398 A1 | 6/2018 | Kaehler et al. | |
| 2018/0349012 A1* | 12/2018 | Hill | G06F 3/011 |
| 2019/0303942 A1* | 10/2019 | Balaraman | H04L 9/3239 |
| 2019/0384389 A1 | 12/2019 | Kim et al. | |
| 2020/0004328 A1* | 1/2020 | Blume | G06F 3/017 |
| 2020/0034995 A1* | 1/2020 | Joshi | G06F 3/012 |
| 2020/0037144 A1 | 1/2020 | Chen et al. | |
| 2021/0183148 A1* | 6/2021 | Van Deventer | G06F 3/011 |
| 2021/0349676 A1 | 11/2021 | Sommer et al. | |
| 2022/0011580 A1 | 1/2022 | Muldoon et al. | |
| 2022/0197485 A1 | 6/2022 | Goodrich et al. | |
| 2022/0255995 A1* | 8/2022 | Berliner | G06T 15/20 |
| 2023/0116190 A1* | 4/2023 | Kies | G06F 3/011 |
| | | | 715/236 |

OTHER PUBLICATIONS

International Search Report and Written Opinion for International Application No. PCT/US2024/011246, dated Apr. 2, 2024 (Apr. 2, 2024)—12 pages.

* cited by examiner

ABSTRACT

AR GLASSES AS IOT REMOTE CONTROL

TECHNICAL FIELD

The present disclosure relates to remote control devices for Internet of Things (IoT) enabled devices. More particularly, but not by way of limitation, the present disclosure describes the use of augmented reality (AR)-enabled wearable electronic devices such as smart glasses as remote control devices for IoT enabled devices.

BACKGROUND

The so-called "Internet of Things" or "IoT" is a network of physical objects that are embedded with sensors, software, and other technologies for enabling connection and exchange of data with other devices via the Internet. For example, IoT devices are used in home automation to control lighting, heating and air conditioning, media and security systems, and camera systems. A number of IoT enabled devices has been provided that function as smart home hubs to connect different smart home products. IoT devices have been used in a number of other applications as well. Application layer protocols and supporting frameworks have been provided for implementing such IoT applications. Artificial intelligence has also been combined with the Internet of Things infrastructure to achieve more efficient IoT operations, improve human-machine interactions, and enhance data management and analytics.

In recent years, so-called "smart" televisions have incorporated IoT features such as Internet connectivity to facilitate streaming services. However, navigation on smart televisions can be quite cumbersome. Often, users have to navigate through menus and screens by using physical 4-directional arrow keys on a remote control device. The number of actions users can perform on a selected item are limited by the physical space available for buttons on the remote control devices. The requirement to use relatively complicated remote control devices has been a source of increasing customer frustration.

BRIEF DESCRIPTION OF THE DRAWINGS

Features of the various implementations disclosed will be readily understood from the following detailed description, in which reference is made to the appended drawing figures. A reference numeral is used with each element in the description and throughout the several views of the drawing. When a plurality of similar elements is present, a single reference numeral may be assigned to like elements.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1A:
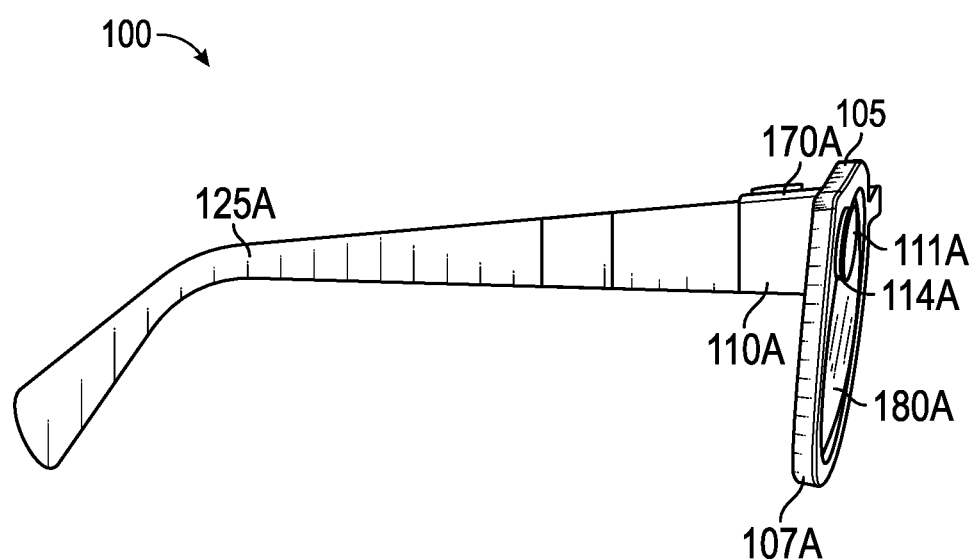
FIG. 1A is a side view of an example eyewear device including an optical assembly with an image display.

AR-enabled wearable electronic devices such as smart glasses are adapted to control an (Internet of Things) IoT device. The AR-enabled device functions as a remote control where the user can control a pointer on a television screen, computer screen, or other IoT enabled device to select items by looking at them and making selections using gestures. In sample configurations, AR-enabled wearable electronic devices such as SPECTACLES™ available from Snap Inc. of Santa Monica, CA, are used as IoT remote control devices for controlling network-connected devices such as smart televisions. Built-in six-degrees-of-freedom (6DoF) tracking (e.g., inertial measurement unit (IMU) combined with camera frames) capabilities are used to move the pointer on the screen to facilitate navigation. To position the cursor, the display screen is tracked in real-world coordinates to determine the point of intersection of the user's view with the screen using raycasting techniques. Hand and head gesture detection are used to allow the user to execute a variety of control actions by performing different gestures. The described techniques are particularly useful for smart displays that offer AR-enhanced content that can be watched in the displays of the AR-enabled wearable electronic devices.

In sample configurations, an AR-enabled eyewear device is adapted to remotely control an Internet of Things (IoT) enabled device (e.g., a smart television) having an IoT display. The AR-enabled eyewear device may include a camera, a display, a memory that stores instructions, and a processor coupled to the camera, the display, and the memory. The processor executes the instructions to configure the eyewear device to implement a method including pairing the eyewear device with the IoT enabled device for communications over a communications interface therebetween, calibrating the eyewear device to a real-world coordinate position of the IoT display, determining an intersection point of a field of view (FOV) of the eyewear device with the IoT display, and sending a cursor position update to the IoT enabled device based on the intersection point over the communications interface. The AR-enabled eyewear device may be further configured to detect at least one of a hand gesture or a head gesture and to send a gesture event to the IoT enabled device over the communications interface. In sample configurations, the gesture event may include at least one gesture identification (ID) of the detected at least one hand gesture or head gesture that is used by the IoT enabled device to perform actions corresponding to the at least one gesture ID. In alternative configurations, the AR-enabled eyewear device may further receive augmentation data on its display corresponding to the gesture ID.

The AR-enabled eyewear device may be recalibrated to adjust for sensor offsets by processing camera frames from the camera, detecting the IoT device in the camera frames, returning a bounding box of the IoT display in the camera frames, obtaining a depth map of the bounding box in the camera frames, combining the bounding box and depth map to determine a current position of the IoT display relative to the eyewear device in real-world coordinates, and adjusting for the sensor offsets using the determined current position of the IoT display. In other configurations, the AR-enabled eyewear device may include an inertial measurement unit (IMU) that provides IMU data. The AR-enabled eyewear device may be calibrated to a real-world coordinate position of the IoT display by detecting quick response (QR) codes displayed in at least three corners of the IoT display, obtaining three-dimensional (3D) coordinate positions of the detected QR codes from camera frame data of the camera and the IMU data of the IMU, and determining from the 3D coordinate positions a position of the IoT display in real-world coordinates. In alternative configurations, the QR codes may be communicated to the IoT enabled device via the communications interface.

In yet other configurations, the intersection point of the FOV of the eyewear device with the IoT display may be determined by tracking a position of the IoT display relative to the eyewear device in real-world coordinates and using raycasting to determine the intersection point of the FOV of the eyewear device with the tracked position of the IoT display. The AR-enabled eyewear device may further send cursor position updates to the IoT device as a user of the eyewear device moves her head or moves around a room containing the IoT enabled device. The AR-enabled eyewear device may send at least one of a default cursor position or an error message to the IoT enabled device when the intersection point of the FOV of the eyewear device with the IoT display cannot be determined.

The following detailed description includes systems, methods, techniques, instruction sequences, and computer program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and methods described because the relevant teachings can be applied or practiced in a variety of ways. The terminology and nomenclature used herein is for the purpose of describing particular aspects only and is not intended to be limiting. In general, well-known instruction instances, protocols, structures, and techniques are not necessarily shown in detail.

The term "connect," "connected," "couple," and "coupled" as used herein refers to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

The orientations of the eyewear device, associated components and any complete devices incorporating an eye scanner and camera such as shown in any of the drawings, are given by way of example only, for illustration and discussion purposes. In operation for a particular variable optical processing application, the eyewear device may be oriented in any other direction suitable to the particular application of the eyewear device, for example up, down, sideways, or any other orientation. Also, to the extent used herein, any directional term, such as front, rear, inwards, outwards, towards, left, right, lateral, longitudinal, up, down, upper, lower, top, bottom and side, are used by way of example only, and are not limiting as to direction or orientation of any optic or component of an optic constructed as otherwise described herein.

Reference now is made in detail to the examples illustrated in the accompanying drawings and discussed below. A sample eyewear device and associated system and method for controlling a pointer on a display of a smart television or computer display device will be described with respect to FIGS. 1-8.

The system described herein includes two types of hardware components: an AR-enabled eyewear device and an IoT enabled display device such as a smart television or computer display. However, it will be appreciated that other IoT enabled devices may be remotely controlled using the techniques described herein. The AR-enabled eyewear device will be described with respect to FIGS. 1-4, and the system for controlling a pointer on a display of a smart television or computer display device will be described with respect to FIGS. 5-8.

In sample configurations, eyewear devices with augmented reality (AR) capability are used in the systems described herein. AR-enabled eyewear devices are desirable to use in the system described herein as such devices are scalable, customizable to enable personalized experiences, enable effects to be applied anytime, anywhere, and ensure user privacy by enabling only the user to see the transmitted information. An AR-enabled eyewear device such as SPECTACLES™ available from Snap Inc. of Santa Monica, California, may be used without any specialized hardware in a sample configuration.

Figure 2A:
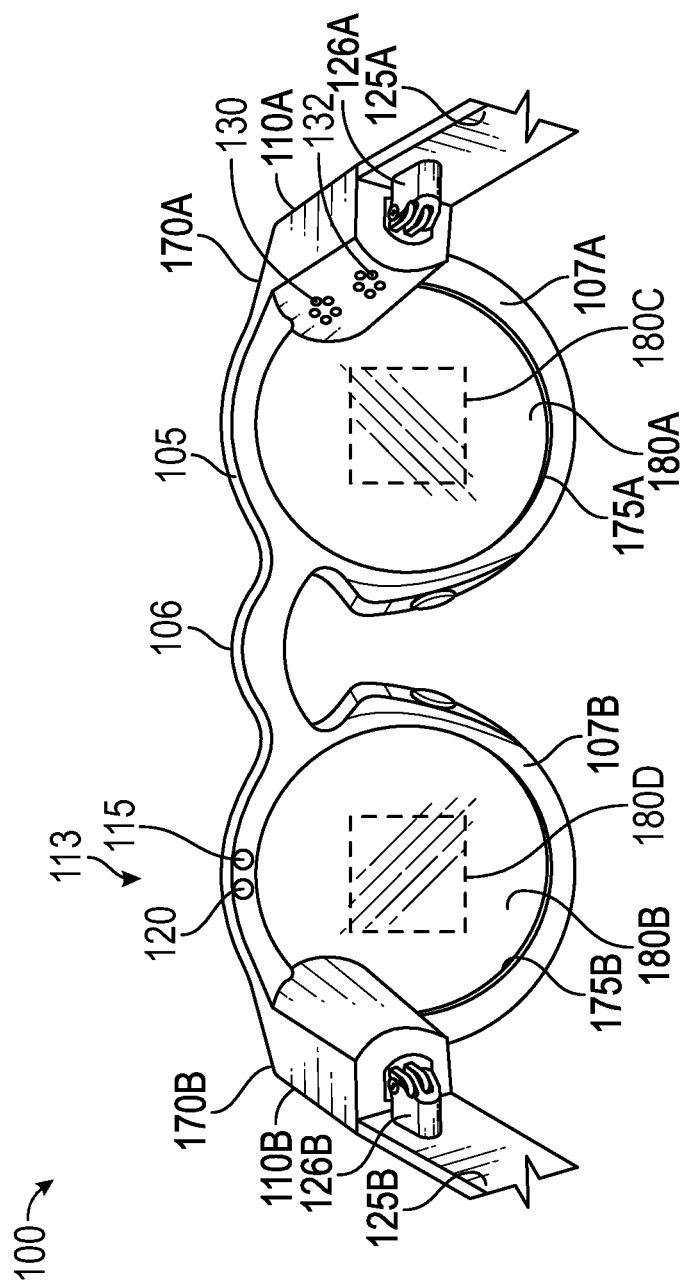
FIGS. 2A-2D are rear views of an example eyewear device depicting an image display.

FIG. 1A is an illustration depicting a side view of an example hardware configuration of an AR-enabled eyewear device 100 including an optical assembly 180A with an image display 180C (FIG. 2A). AR-enabled eyewear device 100 includes multiple visible light cameras 114A and 114B (FIG. 3) that form a stereo camera, of which the first visible light camera 114A is located on a right temple 110A and the second visible light camera 114B is located on a left temple 110B (FIG. 2A). In the illustrated example, the optical assembly 180A is located on the right side of the AR-enabled eyewear device 100. The optical assembly 180A can be located on the left side or other locations of the AR-enabled eyewear devices 100.

Figure 3:
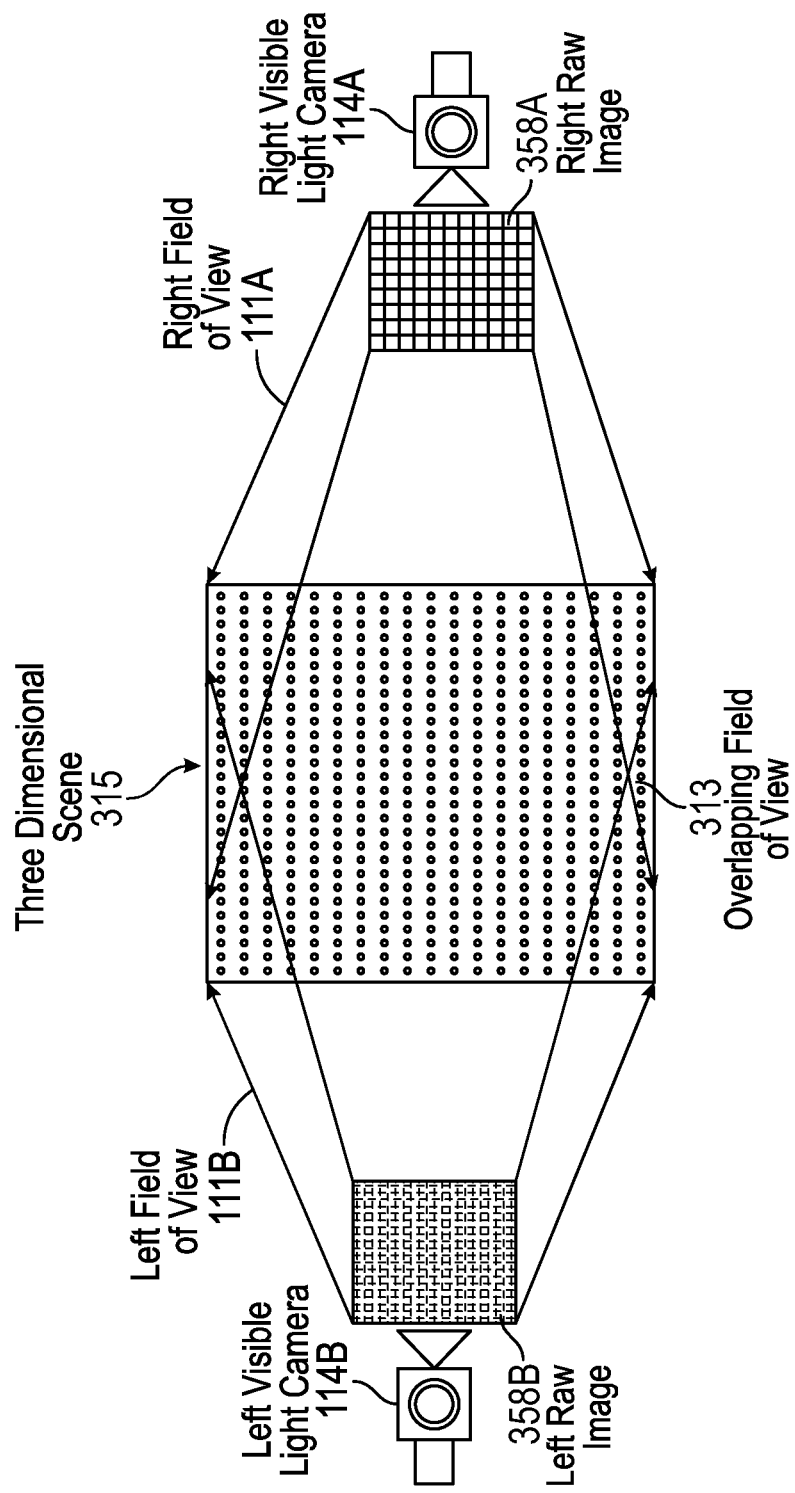
FIG. 3 is a diagram illustrating an example of capturing visible light using an example eyewear device illustrated in any of the proceeding figures.

The visible light cameras 114A and 114B may include an image sensor that is sensitive to the visible light range wavelength. Each of the visible light cameras 114A and 114B has a different frontward facing angle of coverage, for example, visible light camera 114A has the depicted field of view (FOV) 111A (FIG. 3). The angle of coverage is an angle range in which the respective image sensor of the visible light cameras 114A and 114B detects incoming light and generates image data. Examples of such visible lights cameras 114A and 114B include a high-resolution complementary metal-oxide-semiconductor (CMOS) image sensor and a video graphic array (VGA) camera, such as 640p (e.g., 640×480 pixels for a total of 0.3 megapixels), 720p, 1080p, 4K, or 8K. Image sensor data from the visible light cameras 114A and 114B may be captured along with geolocation data, digitized by an image processor, and stored in a memory.

To provide stereoscopic vision, visible light cameras 114A and 114B may be coupled to an image processor (element 412 of FIG. 4) for digital processing and adding a timestamp corresponding to the scene in which the image is captured. Image processor 412 may include circuitry to receive signals from the visible light cameras 114A and 114B and to process those signals from the visible light cameras 114A and 114B into a format suitable for storage in the memory (element 434 of FIG. 4). The timestamp may be added by the image processor 412 or other processor that controls operation of the visible light cameras 114A and 114B. Visible light cameras 114A and 114B allow the stereo camera to simulate human binocular vision. Stereo cameras also provide the ability to reproduce three-dimensional images of a three-dimensional scene (scene 315 of FIG. 3) based on two captured images (image pairs 358A and 358B of FIG. 3) from the visible light cameras 114A and 114B, respectively, having the same timestamp. Such three-dimensional images allow for an immersive virtual experience that feels realistic, e.g., for virtual reality or video gaming. For stereoscopic vision, the pair of images 358A and 358B may be generated at a given moment in time—one image for each of the visible light cameras 114A and 114B. When the pair of generated images 358A and 358B from the frontward facing field of view 111A and 111B of the visible light cameras 114A and 114B are stitched together (e.g., by the image processor 412), depth perception is provided by the optical assemblies 180A and 180B.

In an example, the AR-enabled eyewear device 100 includes a frame 105, a right rim 107A, a right temple 110A extending from a right lateral side 170A of the frame 105, and a see-through image display 180C (FIGS. 2A-B) comprising optical assembly 180A to present a graphical user interface (GUI) or other image to a user. The AR-enabled eyewear device 100 includes the first visible light camera 114A connected to the frame 105 or the right temple 110A to capture a first image of the scene. AR-enabled eyewear device 100 further includes the second visible light camera 114B connected to the frame 105 or the left temple 110B to capture (e.g., simultaneously with the first visible light camera 114A) a second image of the scene which at least partially overlaps the first image. Although not shown in FIGS. 1A and 1B, a processor 432 (FIG. 4) is coupled to the AR-enabled eyewear device 100 and is connected to the visible light cameras 114A and 114B and memory 434 (FIG. 4) accessible to the processor 432, and programming in the memory 434 may be provided in the AR-enabled eyewear device 100 itself.

Figure 1B:
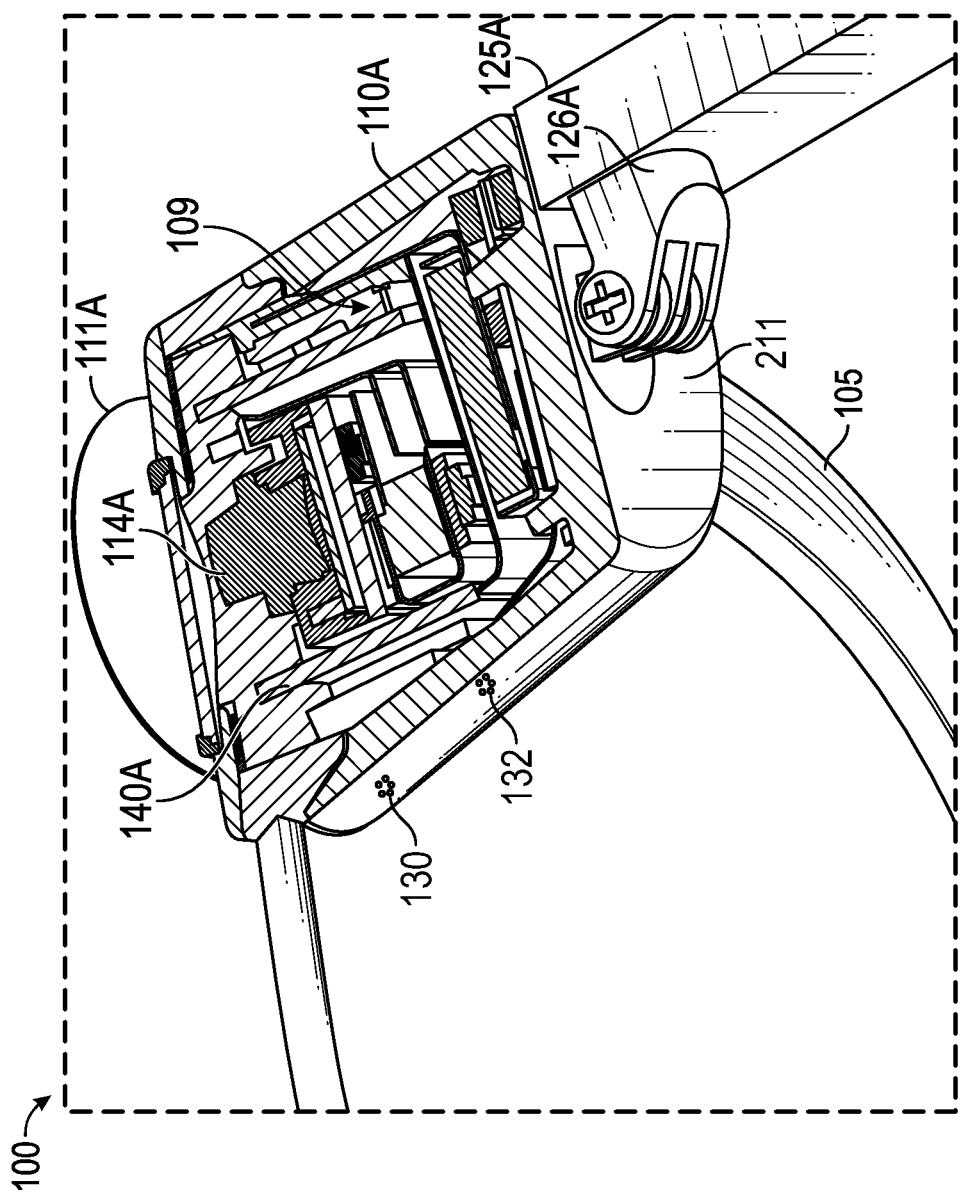
FIG. 1B is a top cross-sectional view of optical components and electronics in a portion of the eyewear device illustrated in FIG. 1A.
Figure 2B:
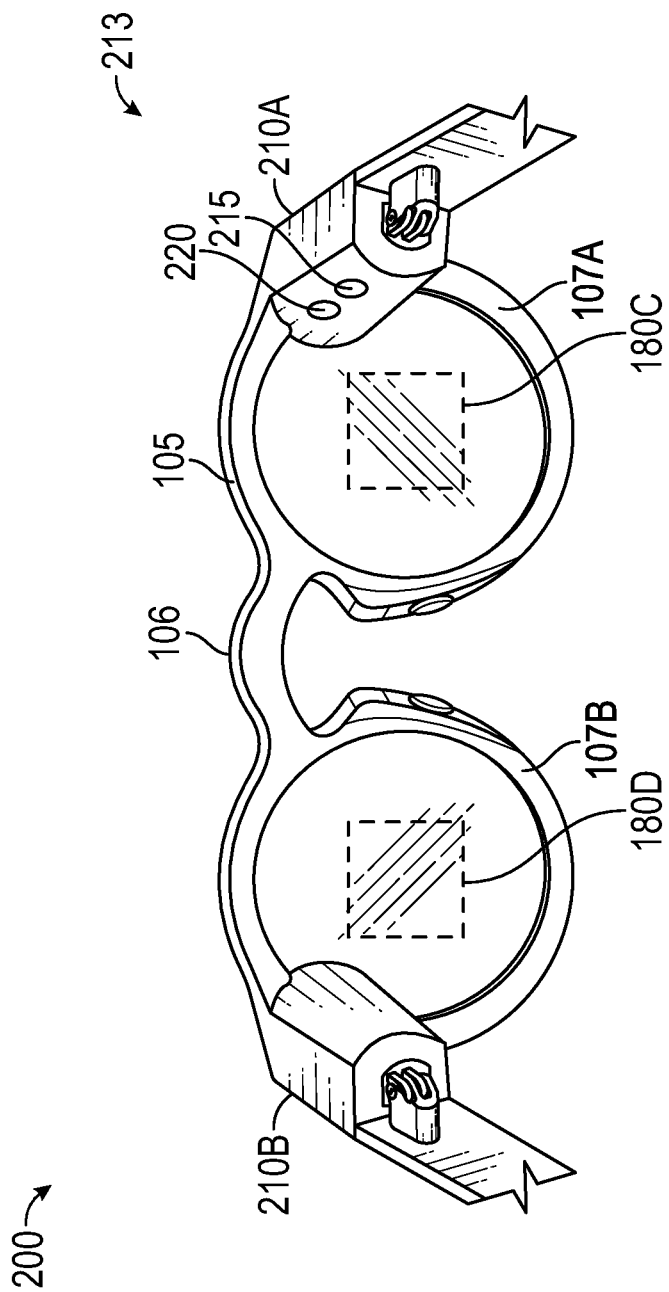
Figure 2C:
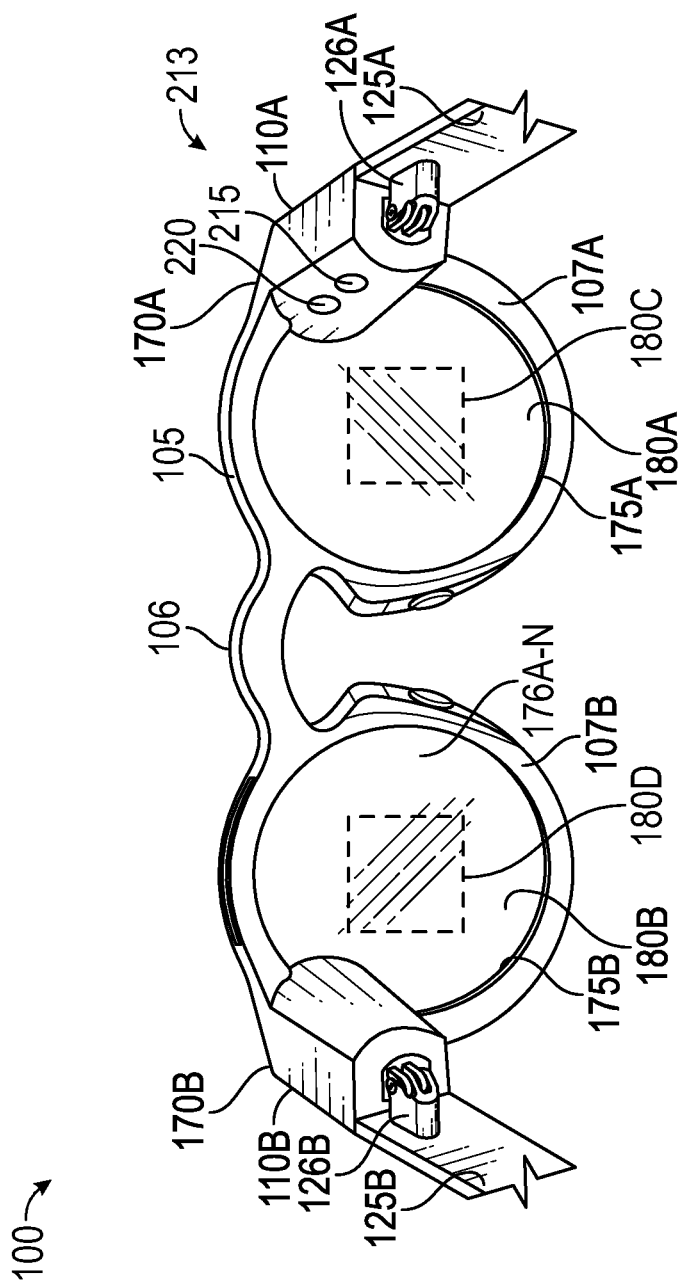

Although not shown in FIG. 1A, the AR-enabled eyewear device 100 also may include a head movement tracker (e.g., Inertial Measurement Unit (IMU) 109 of FIG. 1B) or an eye movement tracker (element 113 of FIG. 2A or element 213 of FIGS. 2B and 2C). AR-enabled eyewear device 100 may further include the see-through image displays 180C and D of optical assemblies 180A and 180B, respectively, for presenting a sequence of displayed images. The AR-enabled eyewear devices 100 may further include an image display driver (element 442 of FIG. 4) coupled to the see-through image displays 180C and 180D to drive the image displays 180C and 180D. The see-through image displays 180C and 180D and the image display driver are described in further detail below. AR-enabled eyewear device 100 may further include the memory 434 and the processor 432 (FIG. 4) having access to the image display driver 442 and the memory 434, as well as programming in the memory 434. Execution of the programming by the processor 432 configures the AR-enabled eyewear device 100 to perform functions, including functions to present, via the see-through image displays 180C and 180D, an initial displayed image of the sequence of displayed images, the initial displayed image having an initial field of view corresponding to an initial head direction or an initial eye gaze direction as determined by the eye movement tracker 113 or 213.

Execution of the programming by the processor 432 may further configure the AR-enabled eyewear device 100 to detect movement of a user of the AR-enabled eyewear device 100 by: (i) tracking, via the head movement tracker (e.g., IMU 109 of FIG. 1B), a head movement of a head of the user, or (ii) tracking, via an eye movement tracker (element 113 of FIG. 2A or element 213 of FIGS. 2B and 2C), an eye movement of an eye of the user of the AR-enabled eyewear device 100. Execution of the programming by the processor 432 may further configure the AR-enabled eyewear device 100 to determine a field of view adjustment to the initial field of view of the initial displayed image based on the detected movement of the user. The field of view adjustment may include a successive field of view corresponding to a successive head direction or a successive eye direction. Execution of the programming by the processor 432 may further configure the AR-enabled eyewear device 100 to generate successive displayed images of the sequence of displayed images based on the field of view adjustment. Execution of the programming by the processor 432 also may configure the AR-enabled eyewear device 100 to present, via the see-through image displays 180C and 180D of the optical assemblies 180A and 180B, the successive displayed images.

FIG. 1B is an illustration depicting a top cross-sectional view of optical components and electronics in a portion of the AR-enabled eyewear device 100 illustrated in FIG. 1A depicting the first visible light camera 114A, a head movement tracker (IMU) 109, and a circuit board 140A. Construction and placement of the second visible light camera 114B is substantially similar to the first visible light camera 114A, except the connections and coupling are on the other lateral side 170B (FIG. 2A). As shown, the AR-enabled eyewear device 100 includes the first visible light camera 114A and a circuit board, which may be a flexible printed circuit board (PCB) 140A. A first hinge 126A connects the right temple 110A to a hinged arm 125A of the AR-enabled eyewear device 100. In some examples, components of the first visible light camera 114A, the flexible PCB 140A, or other electrical connectors or contacts may be located on the right temple 110A or the first hinge 126A.

As shown, AR-enabled eyewear device 100 may include a head movement tracker 109, which includes, for example, an inertial measurement unit (IMU). An IMU is an electronic device that measures and reports a body's specific force, angular rate, and sometimes the magnetic field surrounding the body, using a combination of accelerometers and gyroscopes, sometimes also magnetometers. The IMU works by detecting linear acceleration using one or more accelerometers and rotational rate using one or more gyroscopes. Typical configurations of IMUs contain one accelerometer, gyroscope, and magnetometer per axis for each of the three axes: horizontal axis for left-right movement (X), vertical axis (Y) for top-bottom movement, and depth or distance axis for up-down movement (Z). The accelerometer detects the gravity vector. The magnetometer defines the rotation in the magnetic field (e.g., facing south, north, etc.) like a compass that generates a heading reference. The three accelerometers detect acceleration along the horizontal, vertical, and depth axis defined above, which can be defined relative to the ground, the AR-enabled eyewear device 100, or the user wearing the AR-enabled eyewear device 100.

AR-enabled eyewear device 100 may detect movement of the user of the AR-enabled eyewear device 100 by tracking, via the head movement tracker 109, the head movement of the user's head. The head movement includes a variation of head direction on a horizontal axis, a vertical axis, or a combination thereof from the initial head direction during presentation of the initial displayed image on the image display. In one example, tracking, via the head movement tracker 109, the head movement of the user's head includes measuring, via the IMU of the head movement tracker 109, the initial head direction on the horizontal axis (e.g., X axis), the vertical axis (e.g., Y axis), or the combination thereof (e.g., transverse or diagonal movement). Tracking, via the head movement tracker 109, the head movement of the user's head further includes measuring, via the IMU, a successive head direction on the horizontal axis, the vertical axis, or the combination thereof during presentation of the initial displayed image.

Tracking, via the head movement tracker 109, the head movement of the user's head may include determining the variation of head direction based on both the initial head direction and the successive head direction. Detecting movement of the user of the AR-enabled eyewear device 100 may further include in response to tracking, via the head movement tracker 109, the head movement of the user's head, determining that the variation of head direction exceeds a deviation angle threshold on the horizontal axis, the vertical axis, or the combination thereof. In sample configurations, the deviation angle threshold is between about 3° to 10°. As used herein, the term "about" when referring to an angle means±10% from the stated amount.

Variation along the horizontal axis slides three-dimensional objects, such as characters, Bitmojis, application icons, etc. in and out of the field of view by, for example, hiding, unhiding, or otherwise adjusting visibility of the three-dimensional object. Variation along the vertical axis, for example, when the user looks upwards, in one example, displays weather information, time of day, date, calendar appointments, etc. In another example, when the user looks downwards on the vertical axis, the AR-enabled eyewear device 100 may power down.

As shown in FIG. 1B, the right temple 110A includes temple body 211 that is configured to receive a temple cap, with the temple cap omitted in the cross-section of FIG. 1B.

Disposed inside the right temple 110A are various interconnected circuit boards, such as PCBs or flexible PCBs 140A, that include controller circuits for first visible light camera 114A, microphone(s) 130, speaker(s) 132, low-power wireless circuitry (e.g., for wireless short-range network communication via BLUETOOTH®), and high-speed wireless circuitry (e.g., for wireless local area network communication via WI-FI®).

The first visible light camera 114A is coupled to or disposed on the flexible PCB 140A and covered by a visible light camera cover lens, which is aimed through opening(s) formed in the right temple 110A. In some examples, the frame 105 connected to the right temple 110A includes the opening(s) for the visible light camera cover lens. The frame 105 may include a front-facing side configured to face outwards away from the eye of the user. The opening for the visible light camera cover lens may be formed on and through the front-facing side. In the example, the first visible light camera 114A has an outward facing field of view 111A with a line of sight or perspective of the right eye of the user of the AR-enabled eyewear device 100. The visible light camera cover lens also can be adhered to an outward facing surface of the right temple 110A in which an opening is formed with an outward facing angle of coverage, but in a different outwards direction. The coupling can also be indirect via intervening components.

The first visible light camera 114A may be connected to the first see-through image display 180C of the first optical assembly 180A to generate a first background scene of a first successive displayed image. The second visible light camera 114B may be connected to the second see-through image display 180D of the second optical assembly 180B to generate a second background scene of a second successive displayed image. The first background scene and the second background scene may partially overlap to present a three-dimensional observable area of the successive displayed image.

Flexible PCB 140A may be disposed inside the right temple 110A and coupled to one or more other components housed in the right temple 110A. Although shown as being formed on the circuit boards 140A of the right temple 110A, the first visible light camera 114A can be formed on another circuit board (not shown) in one of the left temple 110B, the hinged arm 125A, the hinged arm 125B, or the frame 105.

FIG. 2A is an illustration depicting a rear view of an example hardware configuration of an AR-enabled eyewear device 100. As shown in FIG. 2A, the AR-enabled eyewear device 100 is in a form configured for wearing by a user, which are eyeglasses in the example of FIG. 2A. The AR-enabled eyewear device 100 can take other forms and may incorporate other types of frameworks, for example, a headgear, a headset, or a helmet.

In the eyeglasses example, AR-enabled eyewear device 100 includes the frame 105 which includes the right rim 107A connected to the left rim 107B via the bridge 106, which is configured to receive a nose of the user. The right and left rims 107A and 107B include respective apertures 175A and 175B, which hold the respective optical elements 180A and 180B, such as a lens and the see-through displays 180C and 180D. As used herein, the term lens is meant to cover transparent or translucent pieces of glass or plastic having curved and flat surfaces that cause light to converge/diverge or that cause little or no convergence/divergence.

Although shown as having two optical elements 180A and 180B, the AR-enabled eyewear device 100 can include other arrangements, such as a single optical element depending on the application or intended user of the AR-enabled eyewear device 100. As further shown, AR-enabled eyewear device 100 includes the right temple 110A adjacent the right lateral side 170A of the frame 105 and the left temple 110B adjacent the left lateral side 170B of the frame 105. The temples 110A and 110B may be integrated into the frame 105 on the respective lateral sides 170A and 170B (as illustrated) or implemented as separate components attached to the frame 105 on the respective lateral sides 170A and 170B. Alternatively, the temples 110A and 110B may be integrated into hinged arms 125A and 125B attached to the frame 105.

In the example of FIG. 2A, an eye scanner 113 is provided that includes an infrared emitter 115 and an infrared camera 120. Visible light cameras typically include a blue light filter to block infrared light detection. In an example, the infrared camera 120 is a visible light camera, such as a low-resolution video graphic array (VGA) camera (e.g., 640×480 pixels for a total of 0.3 megapixels), with the blue filter removed. The infrared emitter 115 and the infrared camera 120 may be co-located on the frame 105. For example, both are shown as connected to the upper portion of the left rim 107B. The frame 105 or one or more of the temples 110A and 110B may include a circuit board (not shown) that includes the infrared emitter 115 and the infrared camera 120. The infrared emitter 115 and the infrared camera 120 can be connected to the circuit board by soldering, for example.

Other arrangements of the infrared emitter 115 and infrared camera 120 may be implemented, including arrangements in which the infrared emitter 115 and infrared camera 120 are both on the right rim 107A, or in different locations on the frame 105. For example, the infrared emitter 115 may be on the left rim 107B and the infrared camera 120 may be on the right rim 107A. In another example, the infrared emitter 115 may be on the frame 105 and the infrared camera 120 may be on one of the temples 110A or 110B, or vice versa. The infrared emitter 115 can be connected essentially anywhere on the frame 105, right temple 110A, or left temple 110B to emit a pattern of infrared light. Similarly, the infrared camera 120 can be connected essentially anywhere on the frame 105, right temple 110A, or left temple 110B to capture at least one reflection variation in the emitted pattern of infrared light.

The infrared emitter 115 and infrared camera 120 may be arranged to face inwards towards an eye of the user with a partial or full field of view of the eye to identify the respective eye position and gaze direction. For example, the infrared emitter 115 and infrared camera 120 may be positioned directly in front of the eye, in the upper part of the frame 105 or in the temples 110A or 110B at either ends of the frame 105.

FIG. 2B is an illustration depicting a rear view of an example hardware configuration of another AR-enabled eyewear device 200. In this example configuration, the AR-enabled eyewear device 200 is depicted as including an eye scanner 213 on a right temple 210A. As shown, an infrared emitter 215 and an infrared camera 220 are co-located on the right temple 210A. The eye scanner 213 or one or more components of the eye scanner 213 can be located on the left temple 210B and other locations of the AR-enabled eyewear device 200, for example, the frame 105. The infrared emitter 215 and infrared camera 220 are like that of FIG. 2A, but the eye scanner 213 can be varied to be sensitive to different light wavelengths as described previously in FIG. 2A. Similar to FIG. 2A, the AR-enabled eyewear device 200 of FIG. 2B includes a frame 105 which includes a right rim 107A which is connected to a left rim 107B via a bridge 106. The rims 107A-B may include respective apertures which hold the respective optical elements 180A and 180B comprising the see-through displays 180C and 180D.

Figure 2D:
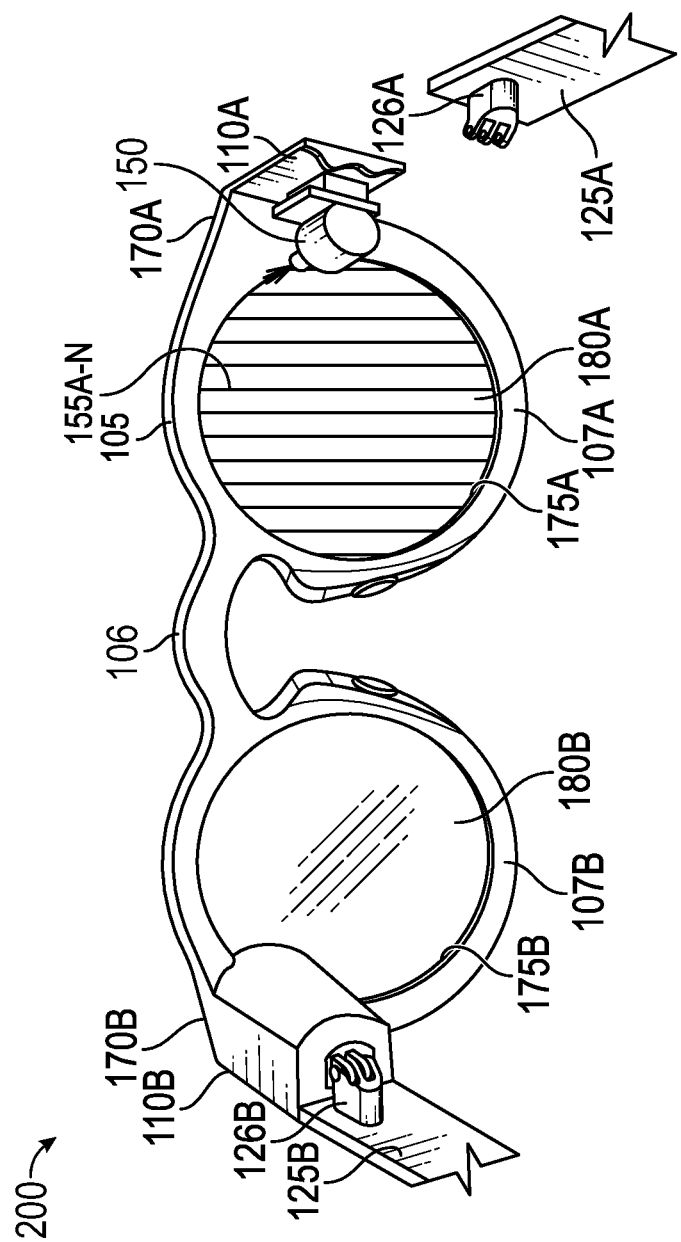

FIG. 2C and FIG. 2D are illustrations depicting rear views of example hardware configurations of the AR-enabled eyewear device 100, including two different types of see-through image displays 180C and 180D. In one example, these see-through image displays 180C and 180D of optical assemblies 180A and 180B include an integrated image display. As shown in FIG. 2C, the optical assemblies 180A and 180B include a display matrix 180C and 180D of any suitable type, such as a liquid crystal display (LCD), an organic light-emitting diode (OLED) display, a waveguide display, or any other such display.

The optical assemblies 180A and 180B also include an optical layer or layers 176A-N, which can include lenses, optical coatings, prisms, mirrors, waveguides, optical strips, and other optical components in any combination. The optical layers 176 can include a prism having a suitable size and configuration and including a first surface for receiving light from a display matrix and a second surface for emitting light to the eye of the user. The prism of the optical layers 176 may extend over all or at least a portion of the respective apertures 175A and 175B formed in the rims 107A and 107B to permit the user to see the second surface of the prism when the eye of the user is viewing through the corresponding rims 107A and 107B. The first surface of the prism of the optical layers 176 faces upwardly from the frame 105 and the display matrix overlies the prism so that photons and light emitted by the display matrix impinge the first surface. The prism may be sized and shaped so that the light is refracted within the prism and is directed towards the eye of the user by the second surface of the prism of the optical layers 176. In this regard, the second surface of the prism of the optical layers 176 can be convex to direct the light towards the center of the eye. The prism can be sized and shaped to magnify the image projected by the see-through image displays 180C and 180D, and the light travels through the prism so that the image viewed from the second surface is larger in one or more dimensions than the image emitted from the see-through image displays 180C and 180D.

In another example, the see-through image displays 180C and 180D of optical assemblies 180A and 180B may include a projection image display as shown in FIG. 2D. The optical assemblies 180A and 180B include a projector 150, which may be a three-color projector using a scanning mirror, a galvanometer, a laser projector, or other types of projectors. During operation, an optical source such as a projector 150 is disposed in or on one of the temples 110A or 110B of the AR-enabled eyewear device 100. Optical assemblies 180A and 180B may include one or more optical strips 155A-N spaced apart across the width of the lens of the optical assemblies 180A and 180B or across a depth of the lens between the front surface and the rear surface of the lens.

As the photons projected by the projector 150 travel across the lens of the optical assemblies 180A and 180B, the photons encounter the optical strips 155. When a particular photon encounters a particular optical strip, the photon is either redirected towards the user's eye, or it passes to the next optical strip. A combination of modulation of projector 150, and modulation of optical strips, may control specific photons or beams of light. In an example, a processor controls the optical strips 155 by initiating mechanical, acoustic, or electromagnetic signals. Although shown as having two optical assemblies 180A and 180B, the AR-enabled eyewear device 100 can include other arrangements, such as a single or three optical assemblies, or the optical assemblies 180A and 180B may have different arrangements depending on the application or intended user of the AR-enabled eyewear device 100.

As further shown in FIG. 2C and FIG. 2D, AR-enabled eyewear device 100 includes a right temple 110A adjacent the right lateral side 170A of the frame 105 and a left temple 110B adjacent the left lateral side 170B of the frame 105. The temples 110A and 110B may be integrated into the frame 105 on the respective lateral sides 170A and 170B (as illustrated) or implemented as separate components attached to the frame 105 on the respective lateral sides 170A and 170B. Alternatively, the temples 110A and 110B may be integrated into the hinged arms 125A and 125B attached to the frame 105.

In one example, the see-through image displays include the first see-through image display 180C and the second see-through image display 180D. AR-enabled eyewear device 100 may include first and second apertures 175A and 175B that hold the respective first and second optical assemblies 180A and 180B. The first optical assembly 180A may include the first see-through image display 180C (e.g., a display matrix, or optical strips and a projector in the right temple 110A). The second optical assembly 180B may include the second see-through image display 180D (e.g., a display matrix, or optical strips and a projector 150 in right temple 110A). The successive field of view of the successive displayed image may include an angle of view between about 15° to 30°, and more specifically 24°, measured horizontally, vertically, or diagonally. The successive displayed image having the successive field of view represents a combined three-dimensional observable area visible through stitching together of two displayed images presented on the first and second image displays.

As used herein, "an angle of view" describes the angular extent of the field of view (FOV) associated with the displayed images presented on each of the image displays 180C and 180D of optical assemblies 180A and 180B. The "angle of coverage" describes the angle range or FOV that a lens of visible light cameras 114A or 114B or infrared camera 220 can image. Typically, the image circle produced by a lens is large enough to cover the film or sensor completely, possibly including some vignetting (i.e., a reduction of an image's brightness or saturation toward the periphery compared to the image center). If the angle of coverage of the lens does not fill the sensor, the image circle will be visible, typically with strong vignetting toward the edge, and the effective angle of view will be limited to the angle of coverage. The FOV is intended to describe the field of observable area which the user of the AR-enabled eyewear device 100 can see through his or her eyes via the displayed images presented on the image displays 180C and 180D of the optical assemblies 180A and 180B. Image display 180C of optical assemblies 180A and 180B can have a FOV with an angle of coverage between 15° to 30°, for example 24°, and have a resolution of 480×480 pixels (or greater; e.g., 720p, 1080p, 4K, or 8K).

Figure 4:
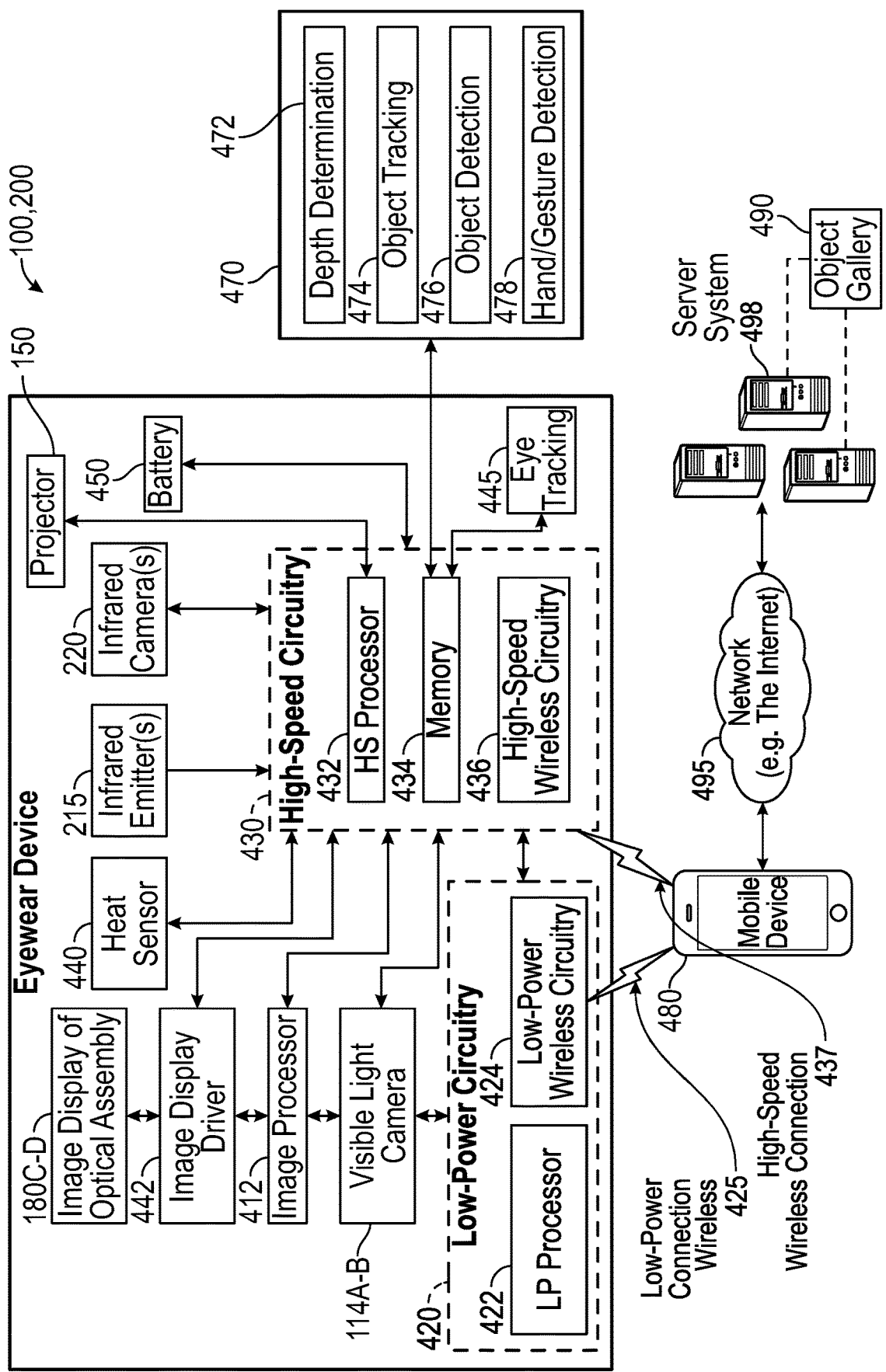
FIG. 4 is a system block diagram of an example eyewear device.

The block diagram in FIG. 3 illustrates an example of capturing visible light with cameras 114A and 114B. Visible light is captured by the first visible light camera 114A with a round FOV 111A. A chosen rectangular first raw image 358A is used for image processing by image processor 412 (FIG. 4). Visible light is also captured by the second visible light camera 114B with a round FOV 111B. A rectangular second raw image 358B chosen by the image processor 412 is used for image processing by processor 412. The raw images 358A and 358B have an overlapping FOV 313. The processor 412 processes the raw images 358A and 358B and generates a three-dimensional image 315 for display by the displays 180C and 180D. The three-dimensional image 315 is also referred to hereafter as an immersive image.

The system block diagram in FIG. 4 illustrates a high-level functional block diagram including example electronic components disposed in AR-enabled eyewear device 100 or 200 in sample configurations. The illustrated electronic components include the processor 432, the memory 434, and the see-through image displays 180C and 180D.

Memory 434 includes instructions for execution by processor 432 to implement the functionality of AR-enabled eyewear devices 100 and 200, including instructions for high-speed processor 432 to control the image 315. Such functionality may be implemented by processing instructions of eye movement tracking programming 445 and gesture detection/object tracking software 470 that is stored in memory 434 and executed by high-speed processor 432. As described below with respect to FIG. 8, the gesture detection/object tracking software 470 may include depth determination software 472, object tracking software 474, object detection software 476, and hand/gesture detection software 478 for use in calibration and intersection point determination of the AR-enabled eyewear device 100 and head tracking and hand/gesture detection by the AR-enabled eyewear device 100.

High speed processor 432 receives power from battery 450 and executes the instructions stored in memory 434. The memory 434 may be a separate component, or memory 434 may be integrated with the processor 432 "on-chip" to perform the functionality of AR-enabled eyewear devices 100 and 200 and to communicate with external devices via wireless connections.

The AR-enabled eyewear devices 100 and 200 may incorporate eye movement tracking programming 445 (e.g., implemented using infrared emitter 215 and infrared camera 220 in FIG. 2B) and may provide user interface adjustments via a mobile device 480 and a server system 498 connected via various networks. Mobile device 480 may be a smartphone, tablet, laptop computer, access point, or any other such device capable of connecting with the AR-enabled eyewear devices 100 or 200 using both a low-power wireless connection 425 and a high-speed wireless connection 437. Mobile device 480 is further connected to server system 498 via a network 495. The network 495 may include any combination of wired and wireless connections.

AR-enabled eyewear devices 100 and 200 may include image display driver 442, image processor 412, low-power circuitry 420, and high-speed circuitry 430. The components shown in FIG. 4 for the AR-enabled eyewear devices 100 and 200 are located on one or more circuit boards, for example, a PCB or flexible PCB 140A and 140B, in the respective temples 110A and 110B. Alternatively, or additionally, the depicted components can be located in the temples, frames, hinges, hinged arms, or bridge of the AR-enabled eyewear devices 100 and 200. The visible light cameras 114A and 114B can include digital camera elements such as a complementary metal-oxide-semiconductor (CMOS) image sensor, charge coupled device, a lens, or any other respective visible or light capturing elements that may be used to capture data, including images of scenes with unknown objects.

Eye movement tracking programming 445 implements the user interface FOV adjustment instructions, including instructions to cause the AR-enabled eyewear devices 100 or 200 to track, via the eye movement tracker 213, the eye movement of the eye of the user of the AR-enabled eyewear devices 100 or 200. Other implemented instructions (functions) cause the AR-enabled eyewear devices 100 and 200 to determine the FOV adjustment to the initial FOV 111A-B based on the detected eye movement of the user corresponding to a successive eye direction. Further implemented instructions generate a successive displayed image of the sequence of displayed images based on the FOV adjustment. The successive displayed image is produced as visible output to the user via the user interface. This visible output appears on the see-through image displays 180C and 180D of optical assemblies 180A and 180B, which is driven by image display driver 442 to present the sequence of displayed images, including the initial displayed image with the initial FOV and the successive displayed image with the successive FOV.

An object tracking model applied by the gesture detection/object tracking software 470 may, for example, detect gestures of the user as well as objects within the environment that are to be recognized by on-device or server-based object recognition software associated with the AR-enabled eyewear device 100 or 200 in sample configurations.

As shown in FIG. 4, high-speed circuitry 430 includes high-speed processor 432, memory 434, and high-speed wireless circuitry 436. In the example, the image display driver 442 is coupled to the high-speed circuitry 430 and operated by the high-speed processor 432 in order to drive the image displays 180C and 180D of the optical assemblies 180A and 180B. High-speed processor 432 may be any processor capable of managing high-speed communications and operation of any general computing system needed for AR-enabled eyewear device 100 or 200. High-speed processor 432 includes processing resources needed for managing high-speed data transfers on high-speed wireless connection 437 to a wireless local area network (WLAN) using high-speed wireless circuitry 436. In certain examples, the high-speed processor 432 executes an operating system such as a LINUX operating system or other such operating system of the AR-enabled eyewear device 100 or 200 and the operating system is stored in memory 434 for execution. In addition to any other responsibilities, the high-speed processor 432 executing a software architecture for the AR-enabled eyewear device 100 or 200 is used to manage data transfers with high-speed wireless circuitry 436. In certain examples, high-speed wireless circuitry 436 is configured to implement wireless communication protocols such as Institute of Electrical and Electronic Engineers (IEEE) 802.11 communication standards, also referred to herein as WI-FI®. In other examples, other high-speed communications standards may be implemented by high-speed wireless circuitry 436.

Low-power wireless circuitry 424 and the high-speed wireless circuitry 436 of the AR-enabled eyewear devices 100 and 200 can include short range transceivers (BLUETOOTH®) and wireless wide, local, or wide area network transceivers (e.g., cellular or WI-FI®). Mobile device 480, including the transceivers communicating via the low-power wireless connection 425 and high-speed wireless connection 437, may be implemented using details of the architecture of the AR-enabled eyewear device 100 and 200, as can other elements of network 495.

Memory 434 includes any storage device capable of storing various data and applications, including, among other things, color maps, camera data generated by the visible light cameras 114A-B and the image processor 412, as well as images generated for display by the image display driver 442 on the see-through image displays 180C and 180D of the optical assemblies 180A and 180B. While memory 434 is shown as integrated with high-speed circuitry 430, in other examples, memory 434 may be an independent standalone element of the AR-enabled eyewear device 100 or 200. In certain such examples, electrical routing lines may provide a connection through a system on chip that includes the high-speed processor 432 from the image processor 412 or low-power processor 422 to the memory 434. In other examples, the high-speed processor 432 may manage addressing of memory 434 such that the low-power processor 422 will boot the high-speed processor 432 any time that a read or write operation involving memory 434 is needed.

Server system 498 may be one or more computing devices as part of a service or network computing system, for example, which includes a processor, a memory, and network communication interface to communicate over the network 495 with the mobile device 480 and AR-enabled eyewear devices 100 and 200. AR-enabled eyewear devices 100 and 200 may be connected with a host computer. For example, the AR0-enabled eyewear devices 100 or 200 may be paired with the mobile device 480 via the high-speed wireless connection 437 or connected to the server system 498 via the network 495. Also, a gallery 490 of snapshots and AR objects may be maintained by the server system 498 for each user and invoked by communications providing links to the stored snapshots and AR objects in gallery 490.

Output components of the AR-enabled eyewear devices 100 and 200 include visual components, such as the image displays 180C and 180D of optical assemblies 180A and 180B as described in FIGS. 2C and 2D (e.g., a display such as a liquid crystal display (LCD), a plasma display panel (PDP), a light emitting diode (LED) display, a projector, or a waveguide). The image displays 180C and 180D of the optical assemblies 180A and 180B are driven by the image display driver 442. The output components of the AR-enabled eyewear devices 100 and 200 may further include acoustic components (e.g., speakers), haptic components (e.g., a vibratory motor), other signal generators, and so forth. The input components of the AR-enabled eyewear devices 100 and 200, the mobile device 480, and server system 498, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

AR-enabled eyewear devices 100 and 200 may include additional peripheral device elements such as ambient light and spectral sensors, biometric sensors, heat sensor 440, or other display elements integrated with AR-enabled eyewear device 100 or 200. For example, the peripheral device elements may include any I/O components including output components, motion components, position components, or any other such elements described herein. The AR-enabled eyewear devices 100 and 200 can take other forms and may incorporate other types of frameworks, for example, a headgear, a headset, or a helmet.

For example, the biometric components of the AR-enabled eyewear devices 100 and 200 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WI-FI® or BLUETOOTH® transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 425 and 437 from the mobile device 480 via the low-power wireless circuitry 424 or high-speed wireless circuitry 436.

Techniques described herein also may be used with one or more of the computer systems described herein or with one or more other systems. For example, the various procedures described herein may be implemented with hardware or software, or a combination of both. For example, at least one of the processor, memory, storage, output device(s), input device(s), or communication connections discussed herein can each be at least a portion of one or more hardware components. Dedicated hardware logic components can be constructed to implement at least a portion of one or more of the techniques described herein. For example, and without limitation, such hardware logic components may include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an ASIC. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionalities, as described herein.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. The software, when executed by the underlying hardware of the module, causes the hardware to perform the specified operations.

Accordingly, the term "module" is understood to encompass at least one of a tangible hardware or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

In sample configurations, the processes described herein may be implemented by instructions stored in the memory 434 of the AR-enabled eyewear devices 100 or 200. The memory 434 may include a machine-readable medium on which is stored one or more sets of data structures or instructions (e.g., software) embodying or utilized by any one or more of the techniques or functions described herein. The instructions also may reside, completely or at least partially, within the high-speed processor 432 or low-power processor 422 during execution thereof by the AR-enabled eyewear device 100. In an example, one or any combination of the hardware processors 432 and 422 and the memory 434 constitute machine-readable media.

The term "machine-readable medium" as used herein may include a single medium or multiple media (e.g., at least one of a centralized or distributed database, or associated caches and servers) configured to store instructions for implementing the processes described herein. The term "machine-readable medium" may include any medium that is capable of storing, encoding, or carrying instructions for execution by the processors 432 and 422 and that cause the AR-enabled eyewear devices 100 or 200 to perform any one or more of the techniques of the present disclosure, or that is capable of storing, encoding, or carrying data structures used by or associated with such instructions. Non-limiting machine-readable medium examples may include solid-state memories, and optical and magnetic media. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and Digital Video Disks (DVD)-ROM disks. In some examples, machine-readable media may include non-transitory machine-readable media. In some examples, machine-readable media may include machine-readable media that is not a transitory propagating signal.

The instructions further may be transmitted or received over wireless connections 425 or 437 or directly via the Internet 495. The AR-enabled eyewear devices 100 and 200 may communicate with one or more other AR-enabled eyewear devices 100 or 200 or mobile devices 480 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone Service (POTS) networks, and wireless data networks (e.g., Institute of Electrical and Electronics Engineers (IEEE) 802.11 family of standards known as WI-FI®), IEEE 802.15.4 family of standards, a Long Term Evolution (LTE) family of standards, a Universal Mobile Telecommunications System (UMTS) family of standards, peer-to-peer (P2P) networks, among others. In an example, the high-speed wireless circuitry 436 and/or the low-power wireless circuitry 424 may include a plurality of antennas to wirelessly communicate using at least one of single-input multiple-output (SIMO), multiple-input multiple-output (MIMO), or multiple-input single-output (MISO) techniques. In some examples, the wireless circuitry 424 and 436 may wirelessly communicate using Multiple User MIMO techniques.

The features and flow charts described herein can be embodied in one or more methods as method steps or in one more applications as described previously. According to some configurations, an "application" or "applications" are program(s) that execute functions defined in the programs. Various programming languages can be employed to generate one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or other mobile operating systems. In this example, the third-party application can invoke API (Application Programming Interface) calls provided by the operating system to facilitate functionality described herein. The applications can be stored in any type of computer readable medium or computer storage device and be executed by one or more general purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of at least one of executable code or associated data that is carried on or embodied in a type of machine-readable medium. For example, programming code could include code for the touch sensor or other functions described herein. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the programming, media content or meta-data files includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to "non-transitory," "tangible," or "storage" media, terms such as computer or machine "readable medium" refer to any medium that participates in providing instructions or data to a processor for execution.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables, copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read at least one of programming code or data. Many of these forms of computer readable media may be involved in carrying one or more sequences of one or more instructions to a processor for execution.

Software applications for using AR-enabled wearable electronic devices such as smart glasses as an IoT remote control where the user can control a pointer on a display screen of an IoT enabled device to select items by looking at them and making selections using gestures will be described with respect to FIGS. 5-8.

The techniques described herein with respect to particular examples use the built-in six-degrees-of-freedom (6DoF) tracking provided by the IMU 109 combined with camera frames capabilities of AR-enabled eyewear devices 100 such as SPECTACLES™ available from Snap Inc. of Santa Monica, CA, to control a cursor on a television or computer screen by performing head movements or gestures. The user of the AR-enabled eyewear device 100 may look towards the item she wants to select to move the cursor over it. Hand tracking capabilities of the AR-enabled eyewear device 100 further enables the user to execute a large variety of actions using different hand gestures. The gestures are translated into actions using the pre-existing gesture recognition framework and ML model of the AR-enabled eyewear device 100. The IMU 109 may also be used to collect head movement data to detect certain head gestures such as tilting the head sideways or left/right to, for example, indicate a desire to switch channels or go the next/previous video, etc.

The hand/head gestures may be divided into two categories:
1. Global gestures for actions such as "Go to Home," "Turn off television," "Start Selected Service," "Go to next," "Go to previous," and the like.
2. Gestures for actions on the selected item such as "Preview," "Select," "Show Ratings," "More Information," and the like.

The AR-enabled eyewear devices 100 described herein thus may offer a manufacturer independent remote control device and an application programming interface (API) that can be adapted by television manufacturers and 3rd-party smart television and computer monitor application developers.

Figure 5A:
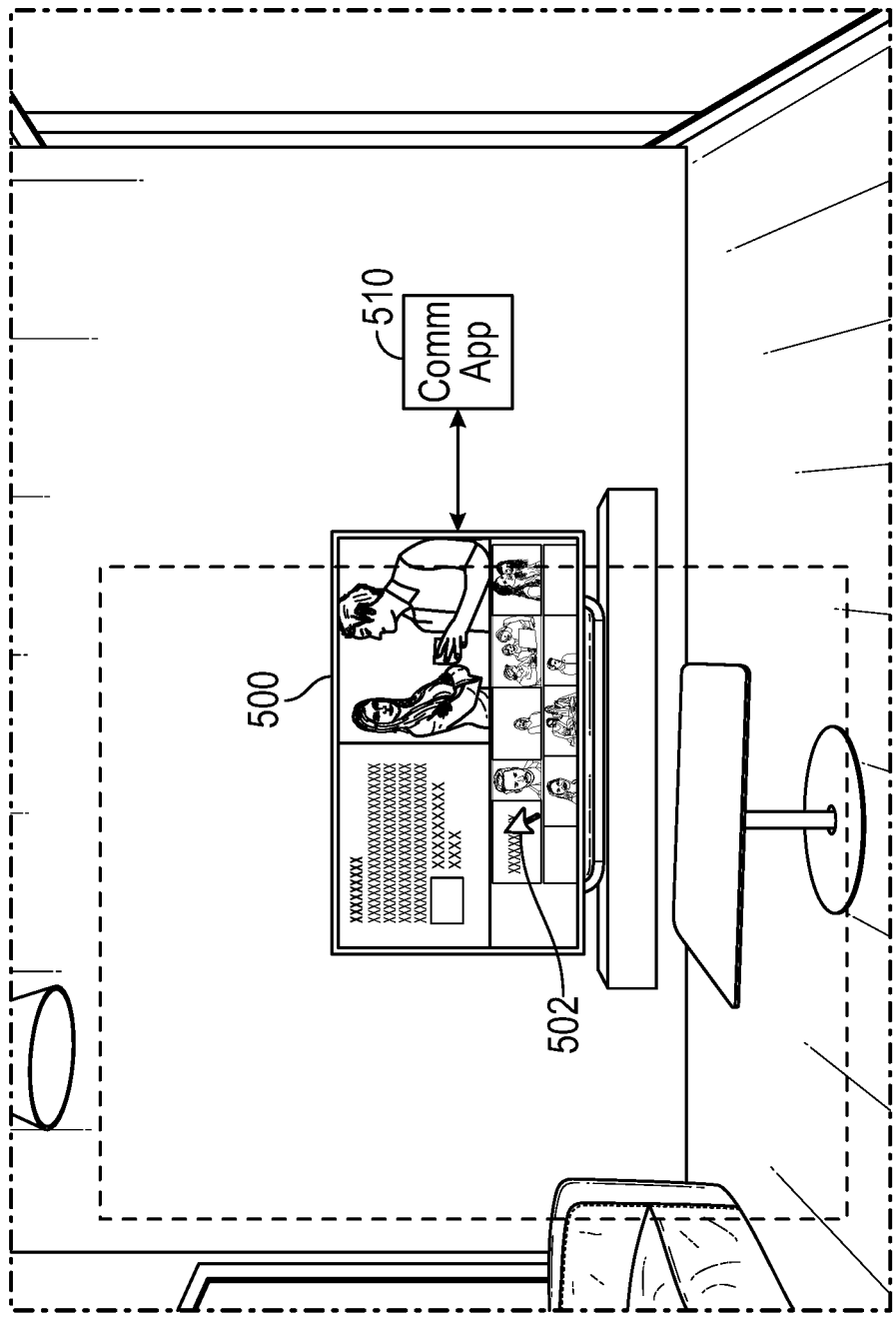
FIG. 5A is a diagram of a smart television display having a cursor displayed thereon.
Figure 5B:
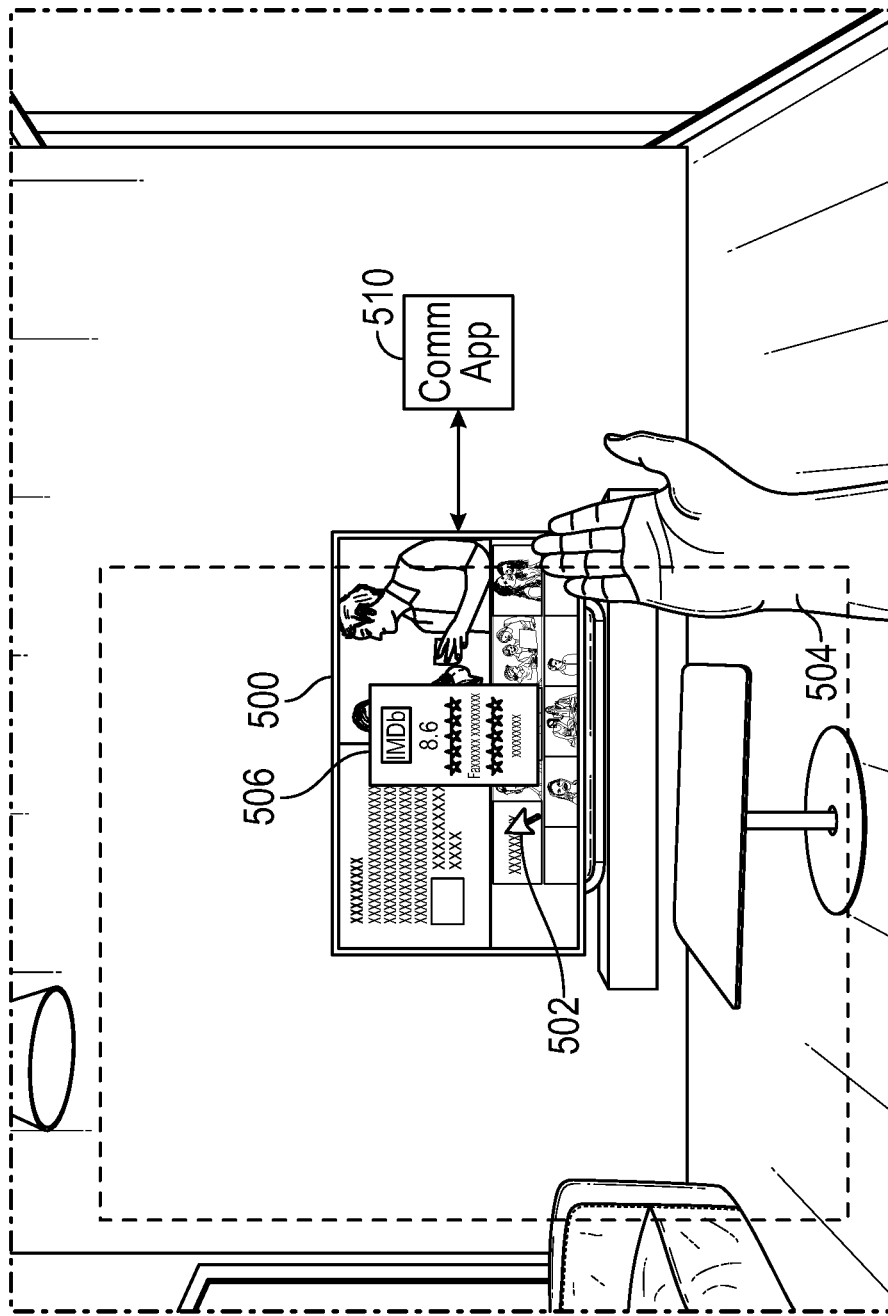
FIG. 5B is a diagram of the smart television display of FIG. 5A where a hand gesture has been provided to trigger a contextual information tooltip showing the IMDB rating and recent user ratings/reviews for the item pointed to by the cursor.

FIG. 5A is a diagram of a smart television display 500 having a cursor 502 displayed thereon as an aligned overlay object for manipulation by an AR-enabled eyewear device 100 in a sample configuration. As illustrated in FIG. 5B, a hand gesture 504 may be recognized by the AR-enabled eyewear device 100 to, for example, trigger a contextual information tooltip 506 showing the IMDB rating and recent user ratings/reviews for the item pointed to by the cursor 502. Similarly, the contextual information tooltip 506 may be a menu for navigation to related items of interest. The contextual items tooltip 506 may be displayed on the smart television display 500 or may be overlayed on the display 180C of the AR-enabled eyewear device 100 as augmented content provided by the smart television or by the server 498, as appropriate.

So-called smart televisions include internet capabilities and are usually connected to a secure, low latency local area network (LAN) either via cable or via WI-FI®. Systems and methods described herein provide an application programming interface (API) exposed by AR-enabled eyewear device 100 for devices on the same private LAN sub-network that can be used to exchange information such as the cursor position, detected hand/head gestures (=actions), and the like. A software development kit (SDK) is provided that can be used by clients (e.g., AR-enabled eyewear device 100 and smart television display 500) to simplify the communications with the API. In sample configurations, the protocol used for the API could be hypertext transfer protocol (HTTP), representational state transfer (REST) API, websockets, and the like, or a more lightweight protocol for IoT applications, such as message queue telemetry transport (MQTT), that also allows streaming to effectively synchronize the cursor position. A pairing flow (part of the API) enables a smart television communications application 510 to pair with the AR-enabled eyewear device 100 to establish a connection. In sample configurations, the smart television communications application 510 may be an application or a library adapted to pair with one or more AR-enabled eyewear devices 100 for communication of events therebetween. Actions and events may be registered to simplify the integration. The smart television communication application 510 may initiate the pairing using the SDK. The SDK internally first sends out a broadcast to which the AR-enabled eyewear device 100 responds whereby the smart television communications application 510 may obtain the private internet protocol (IP) address of the AR-enabled eyewear device 100 and then send a connection request to the AR-enabled eyewear device 100.

Once the smart television communication application 510 and the AR-enabled eyewear device 100 are paired, the respective devices can use the API (via SDK) to register callbacks and to subscribe for detected actions (hand/head gestures) and changes of the cursor position. In sample configurations, a predefined set of hand/head gestures are supported. Once a known gesture is detected, the detected gesture and/or corresponding action are communicated to the smart television communications application 510 that has registered a callback (HTTP REST endpoint or subscribed to the action in case of MQTT). In sample configurations, each gesture/action has a documented identifier (gesture ID), and the respective devices may decide on their own how certain gestures and/or actions are to be used. For example, a hand gesture showing a "thumbs up" may be given a gesture ID that is recognized by the smart television display 500 to indicate that the volume is to be turned up on the smart television. Similarly, a head tilt may be recognized by the AR-enabled eyewear device 100 and assigned a gesture ID that is recognized by the smart television display 500 as a request to change channels up or down. Accordingly, a volume control signal (increase volume) or a change channel signal may be sent to the smart television communications application 510 for use by an internal processor of the smart television display 500 to increase the volume or change the channel through actions recognized by the AR-enabled eyewear device 100.

During pairing of the smart television communications application 510 and the AR-enabled eyewear device 100 or in the device settings of the smart television display 500, the user can initiate a calibration flow (part of the API) to calibrate the gyro sensor and IMU data from the AR-enabled eyewear device 100 to a predetermined portion (e.g. the center) of the smart television display 500. To perform such calibration, the user is asked to look towards the smart television display 500, which includes three detectable codes in the corners thereof for aligning the AR-enabled eyewear device 100 with the smart television display 500 in real-world coordinates.

Figure 6:
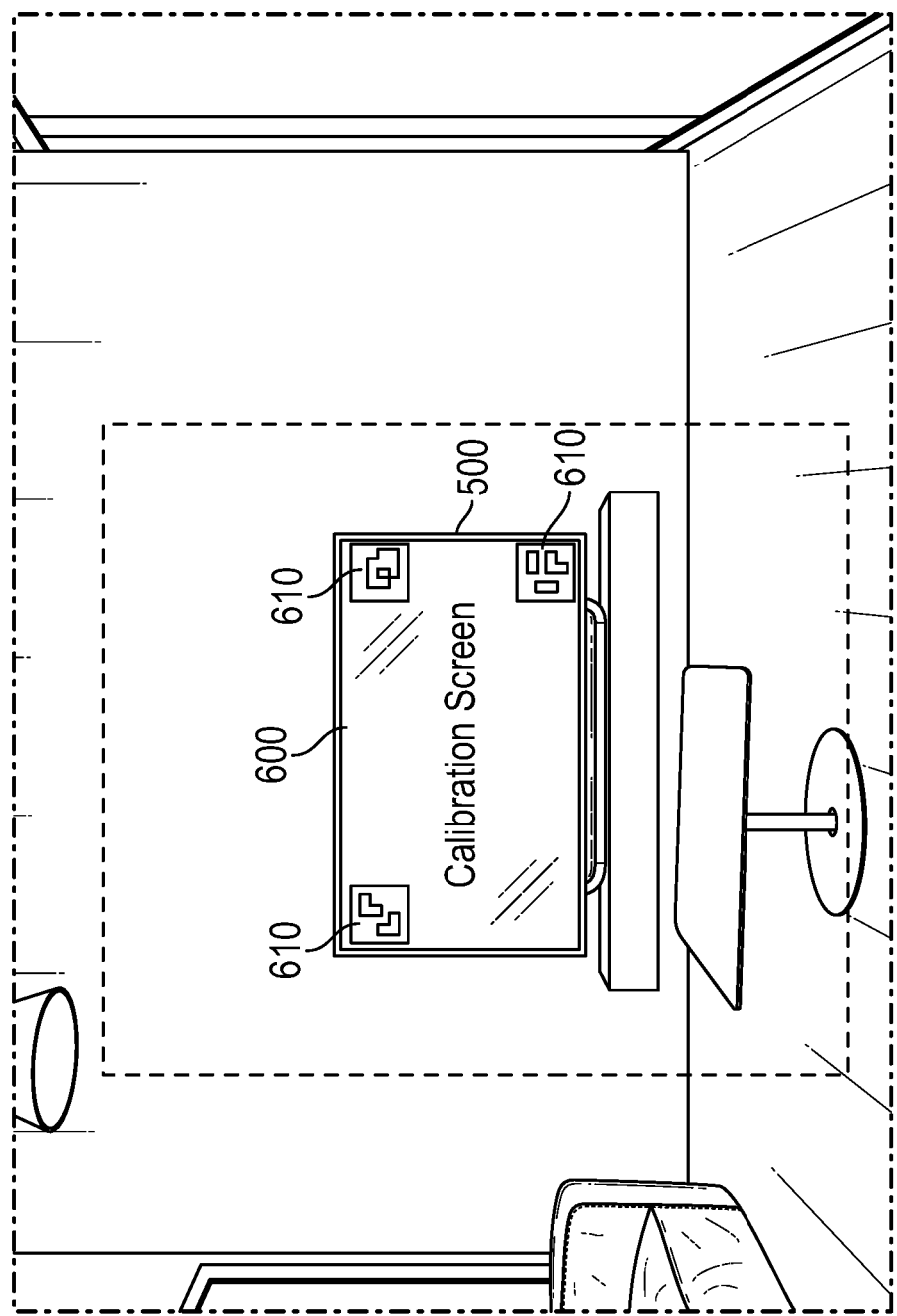
FIG. 6 is a diagram of a sample calibration screen on a smart television display for use in calibrating the user's AR-enabled electronic eyewear device to the smart television display in a sample configuration.

For example, FIG. 6 is a diagram of a sample calibration screen 600 on a smart television display 500 for use in calibrating the user's AR-enabled eyewear device 100 to the smart television display 500 in a sample configuration. As illustrated, quick response (QR) codes 610 are displayed in three corners of the smart television display 500. The QR codes 610 are detected and the depth data (depth map) is used by an existing depth service of the AR-enabled eyewear device 100 to obtain the 3D coordinate positions of the detected QR codes 610 from the camera frame data of the AR-enabled eyewear device 100. Using these 3D coordinate positions, the television screen rectangle (plane) real-world coordinates may be determined. Using a six-degrees-of-freedom (6DOF) tracker that uses IMU data combined with camera frames of the AR-enabled eyewear device 100, the screen rectangle of the smart television display 500 may be tracked by the AR-enabled eyewear device 100 relative to the user's position. For example, the IMU data may be used to detect rotation and/or tilt of the head of the user of the AR-enabled eyewear device 100 relative to the real-world coordinates of the rectangle of the smart television display 500.

Alternatively, the QR codes 610 may be communicated to the smart television display 500 by the AR-enabled eyewear device 100 (e.g., using Chromecast or otherwise communicated to the smart television communication application 510 via the API between the smart television display 500 and the AR-enabled eyewear device 100) for display in the corners of the smart television display 500 to facilitate the calibration process.

The position of the smart television display 500 also may be recalibrated using object detection. For example, an object tracking service (e.g., simultaneous localization and mapping (SLAM) service) may develop an offset in the tracked position (tracked object position versus real physical object position) over time (sensor offset). To correct for such a sensor offset, the tracked object position may be calibrated in a certain interval to minimize the sensor offset by visually detecting the smart television display 500 using the existing object detection framework/infrastructure of the gesture detection/object tracking software 470. The object detection framework may process the camera input stream (frames), detect the smart television display 500, and return the bounding box of the smart television display 500 in the camera frames. The depth service may be used to obtain a depth map of the detected bounding box in the camera frames (at time x). Combining this information allows the current corrected screen rectangle of the smart television display 500 to be calculated in real-world coordinates. Any offsets of the position of the cursor 502 that develop over time due to use of the IMU data and SLAM service data may be adjusted through such recalibration. It will be appreciated that the adjustment data may be Chromecast to the television display or otherwise communicated to the smart television communication application 510 via the API between the smart television display 500 and the AR-enabled eyewear device 100.

Figure 7:
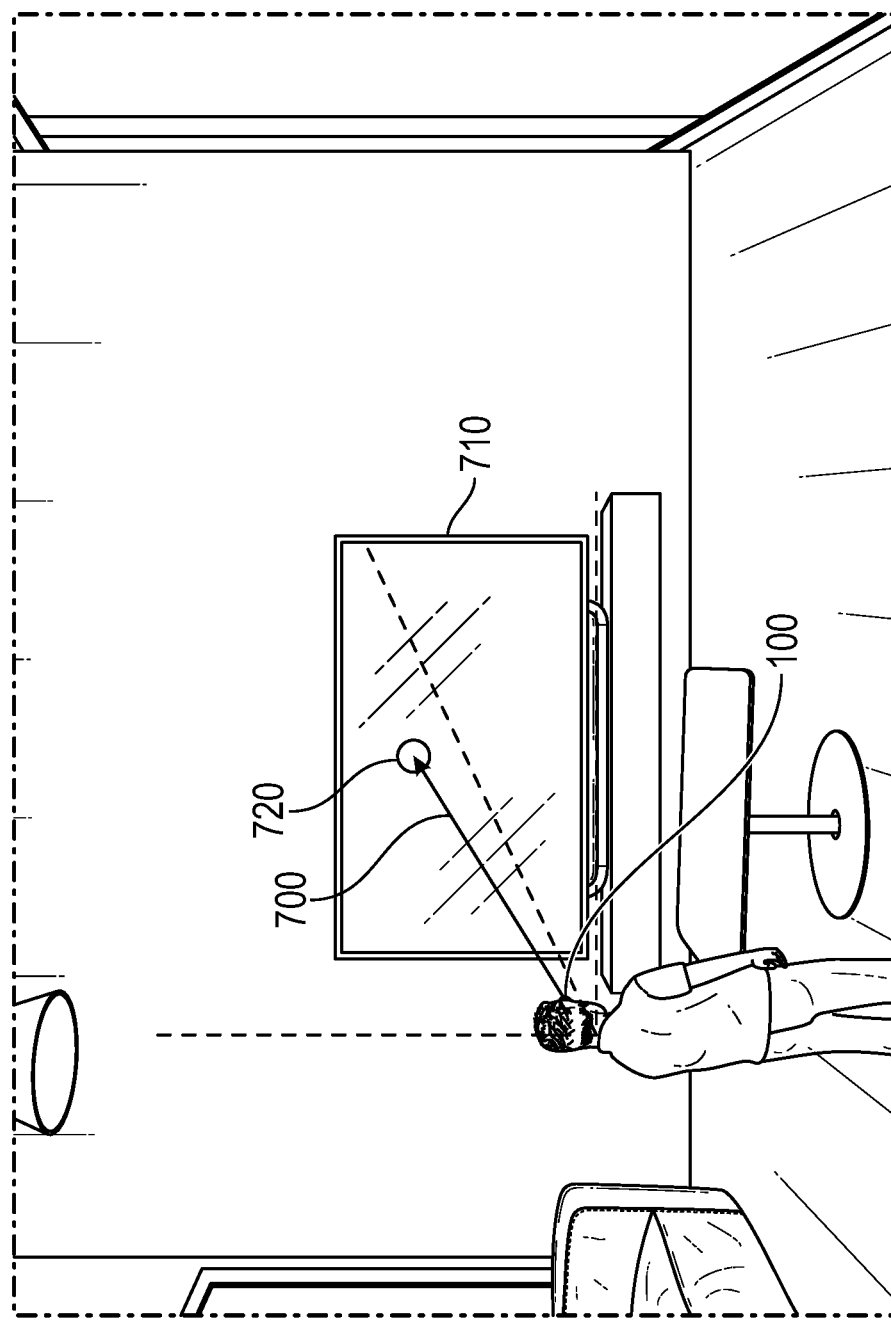
FIG. 7 is a diagram illustrating raycasting for identifying the position on the screen that is being viewed by the user's AR-enabled electronic eyewear device for use in placing the cursor on the smart television display.

In an example configuration, once the AR-enabled eyewear device 100 is calibrated relative to the smart television display 500, the position of the cursor 502 on the smart television display 500 may be determined by finding an intersection point between the screen rectangle (tracked 3D position) of the smart television display 500 and an orthogonal line originating from the center of the FOV of the AR-enabled eyewear device 100 that is directed towards the smart television display 500 using raycasting techniques. For example, FIG. 7 illustrates raycasting of the orthogonal line 700 from the AR-enabled eyewear device 100 to the tracked 3D position of the screen rectangle 710 for identifying the intersection point position 720 on the smart television display 500 that it being viewed by the user's AR-enabled eyewear device 100 at any given time for use in placing the cursor 502 on the smart television display 500. The intersection point position 720 is solvable with regular linear algebraic equations well known to those skilled in the art. In a sample configuration, the infrastructure provided by LensStudio (available from Snap Inc. of Santa Monica, CA) may be reused to calculate the intersection point position 720 of the cursor 502.

For those situations where there is no solution to the intersection point position equation (e.g., the user is not looking at or is looking past the smart television display 500 or the user is beside or behind the smart television display 500), a default position may be sent to the smart communications application 510 of the smart television and/or an appropriate message may be sent to each of the clients connected to the communications API.

Figure 8:
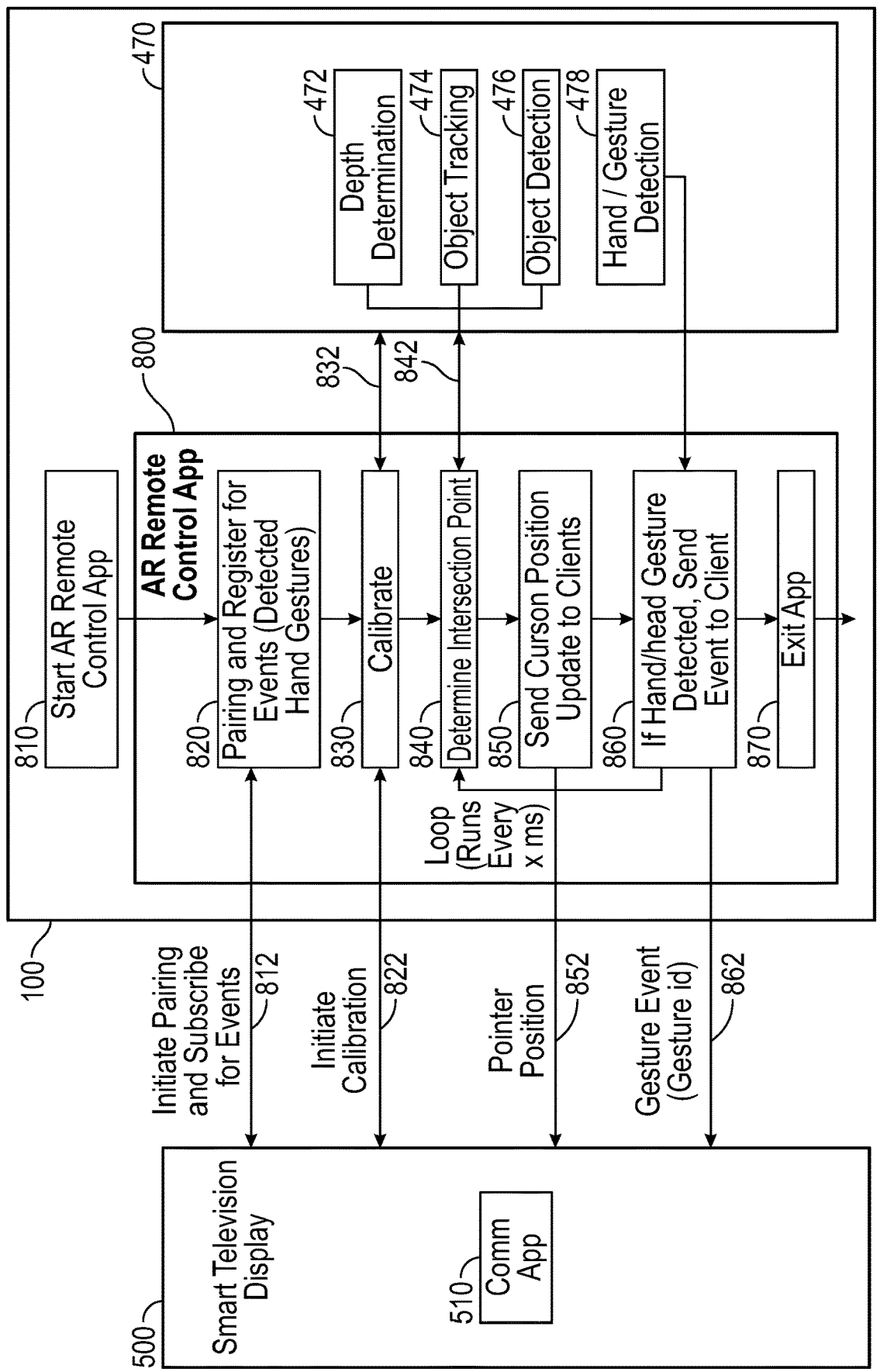
FIG. 8 is a flow chart of the method for controlling a cursor on a smart television screen or a computer display screen in a sample configuration.

FIG. 8 is a flow chart of a method for controlling a cursor 502 on a smart television display 500, a computer display, or other IoT device display in a sample configuration. As illustrated, a smart television display 500 may be adapted by an SDK to include a communication application 510 to facilitate communications over an API with an AR-enabled eyewear device 100 to exchange information such as the cursor position, detected hand/head gestures, and the like. Similarly, the AR-enabled eyewear device 100 may be adapted to include an AR remote control application 800 developed using the SDK.

During operation, when the AR remote control application 800 has been started at 810, pairing with the AR-enabled eyewear device 100 may be initiated by the communication application 510. The communication application 510 initiates the pairing and subscribes for dynamic events at 812 by sending requests using, for example, low latency, low payload overhead MQTT. At 820, the AR remote control application 800 is paired with the smart television display 500 and is registered for events such as detected hand gestures.

The calibration process 830 is initiated at 822. For example, the calibration process described with respect to FIG. 6 may be implemented. As noted above with respect to FIG. 6, the calibration process 830 may require a depth determination and/or object detection and tracking. In sample configurations, the depth determination software 472, object tracking software 474, and object detection software 476 of the gesture detection/object tracking software 470 of the AR-enabled eyewear device 100 may be called at 832 to support the calibration calculations. For example, object detection software 476 and object tracking software 474 may implement a SLAM process for automatic recalibration instead of the QR codes 610.

Once the AR-enabled eyewear device 100 has been calibrated at 830, the intersection point 720 of the FOV of the AR-enabled eyewear device 100 with the smart television display 500 is calculated at 840 using, for example, the raycasting techniques described above with respect to FIG. 7. In sample configurations, the depth determination software 472, object tracking software 474, and object detection software 476 of the gesture detection/object tracking software 470 of the AR-enabled eyewear device 100 may be called at 842 to support the intersection point calculations. The intersection point determined at 840 is recognized as the desired cursor position, and a cursor position update 852 is sent at 850 to all registered clients (e.g., smart television communication application 510). The position of the rectangle of the smart television display 500 may be tracked in real-world coordinates using a SLAM service of the gesture detection/object tracking software 470 for such intersection point determinations.

If a hand or head gesture is detected by the hand/gesture detection software 478 at 860, a gesture event 862 is sent to all registered clients (e.g., smart television communication application 510). In sample configurations, the gesture event 862 includes a gesture ID recognized by the hand/gesture detection software 478 (e.g., thumb facing upward, head tilt, head rotation, etc.). The gesture ID may be used by the registered clients to perform input actions (e.g., change stations, volume control, select rating/reviews, etc.) that have been mapped to the gesture ID by the respective registered clients.

Steps 840-860 repeat continuously as long as the AR remote control application 810 is in operation. As noted above, the AR-enabled eyewear device 100 also may be recalibrated from time to time to adjust for sensor offsets by visually detecting the smart television display 500 using the existing object detection framework/infrastructure of the gesture detection/object tracking software 470 and adjusting for sensor offset.

The AR remote control application 800 is exited at 870.

Thus, the AR remote control application 800 enables a user wearing an AR-enabled eyewear device 100 to present a cursor 502 on a smart television display 500 at the intersection point 720 of an orthogonal ray cast from the AR-enabled eyewear device 100 and the smart television display 500 and to update the position of the cursor 502 as the user moves her head and as she moves around the room. The intersection point 720 is continually tracked and updated to reflect the updated cursor position so long as the user's FOV intersects with the smart television display 500. The user may also perform a gesture to make selections on the smart television display 500. In sample configurations, the AR remote control application 800 may be exited once the desired selections have been made so that the cursor 502 does not interfere with the viewing of the information on the smart television display 500 during use. A toggle may be provided on the AR-enabled eyewear device 100 for turning on/off the AR remote control application 800, as desired. Alternatively, the AR remote control application 800 may remain active but the cursor may be programmed to disappear a predetermined amount of time after a user selection.

In other configurations, the user may perform gestures that are recognized by the AR-enabled eyewear device 100 and provided to the smart television display 500 as described above. However, instead of making selections that are displayed on the smart television display 500, the gesture ID may be mapped to augmentation data that is provided to the display of the AR-enabled eyewear device 100 from the smart television communication application 510 or from a third-party server as an overlay. For example, the user may select a streaming application from the smart television display 500 using the techniques described above. The server of the streaming application may send augmentation data in the form of menus or other displays that may be directly navigated on the user's AR-enabled eyewear device 100. Any selections of the presented augmentation data on the AR-enabled eyewear device 100 may be communicated to the smart television communications application 510 for making the desired selection by the smart television display 500.

Those skilled in the art will appreciate that the remote control operations described herein are not limited to smart televisions. Any device that may be connected to a local area network and that accepts remote control inputs (e.g., IoT devices) may be controlled by an AR-enabled eyewear device 100 using the techniques described herein.

The scope of protection is limited solely by the claims that now follow. That scope is intended and should be interpreted to be as broad as is consistent with the ordinary meaning of the language that is used in the claims when interpreted considering this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are the best mode and other examples, it is understood that various modifications may be made therein and that the subject matter disclosed herein may be implemented in various forms and examples, and that they may be applied in numerous applications, only some of which have been described herein. It is intended by the following claims to claim all modifications and variations that fall within the true scope of the present concepts.

What is claimed is:

1. An eyewear device adapted to remotely control an Internet of Things (IOT) enabled device having an IoT display, the eyewear device comprising:
   a camera;
   a memory that stores instructions; and
   a processor coupled to the camera and the memory, wherein the processor executes the instructions to configure the eyewear device to:
   pair the eyewear device with the IoT enabled device for communications over a communications interface therebetween by configuring the eyewear device to subscribe for dynamic events including messages relating to at least one of hand gestures or head gestures on the communications interface;
   calibrate the eyewear device to a real-world coordinate position of the IoT display;
   determine an intersection point of a field of view (FOV) of the eyewear device with the IoT display; and
   send a cursor position update to the IoT enabled device based on the intersection point over the communications interface.

2. The eyewear device of claim 1, wherein the processor further executes instructions to configure the eyewear device to:
   detect at least one of a hand gesture or a head gesture; and
   send a gesture event to the IoT enabled device over the communications interface,
   wherein the gesture event includes at least one gesture identification (ID) of the detected at least one hand gesture or head gesture that is used by the IoT enabled device to perform actions corresponding to the at least one gesture ID.

3. The eyewear device of claim 2, further comprising a display, wherein the processor further executes instructions to configure the eyewear device to receive augmentation data on the display corresponding to the gesture ID.

4. The eyewear device of claim 1, wherein the processor further executes instructions to configure the eyewear device to recalibrate the eyewear device by processing camera frames from the camera, detecting the IOT enabled device in the camera frames, returning a bounding box of the IoT display in the camera frames, obtaining a depth map of the bounding box in the camera frames, combining the bounding box and depth map to determine a current position of the IoT display relative to the eyewear device in real-world coordinates, and adjusting for a sensor offset using the determined current position of the IoT display.

5. The eyewear device of claim 1, wherein the processor further executes instructions to pair the eyewear device with the IoT enabled device by sending requests over the communications interface in a protocol comprising at least one of hypertext transfer protocol (HTTP), representational state transfer (REST) API, websockets, or message queue telemetry transport (MQTT).

6. The eyewear device of claim 1, further comprising an inertial measurement unit (IMU), wherein the processor further executes instructions to calibrate the eyewear device to a real-world coordinate position of the IoT display by detecting quick response (QR) codes displayed in at least three corners of the IoT display, obtaining three-dimensional (3D) coordinate positions of the detected QR codes from camera frame data of the camera and IMU data of the IMU, and determining from the 3D coordinate positions a position of the IoT display in real-world coordinates.

7. The eyewear device of claim 6, wherein the processor further executes instructions to communicate the QR codes to the IoT enabled device via the communications interface.

8. The eyewear device of claim 1, wherein the processor further executes instructions to determine the intersection point of the FOV of the eyewear device with the IoT display by tracking a position of the IoT display relative to the eyewear device in real-world coordinates and using raycasting to determine the intersection point of the FOV of the eyewear device with the tracked position of the IoT display.

9. The eyewear device of claim 1, wherein the processor further executes instructions to configure the eyewear device to send cursor position updates to the IoT enabled device as a user of the eyewear device moves her head or moves around a room containing the IOT enabled device.

10. The eyewear device of claim 9, wherein the processor further executes instructions to configure the eyewear device to send at least one of (a) a default cursor position or (b) an error message to the IoT enabled device when the intersection point of the FOV of the eyewear device with the IoT display cannot be determined.

11. The eyewear device of claim 1, wherein the IOT enabled device comprises a smart television.

12. A method of remotely controlling an Internet of Things (IOT) enabled device having an IoT display using an augmented reality (AR)-enabled eyewear device, comprising:
pairing the AR-enabled eyewear device with the IOT enabled device for communications over a communications interface therebetween by configuring the eyewear device to subscribe for dynamic events including messages relating to at least one of hand gestures or head gestures on the communications interface;
calibrating the AR-enabled eyewear device to a real-world coordinate position of the IoT display;
determining an intersection point of a field of view (FOV) of the AR-enabled eyewear device with the IoT display; and
sending a cursor position update to the IoT enabled device based on the intersection point over the communications interface.

13. The method of claim 12, further comprising:
detecting at least one of a hand gesture or a head gesture; and
sending a gesture event to the IoT enabled device over the communications interface,
wherein the gesture event includes at least one gesture identification (ID) of the detected at least one hand gesture or head gesture that is used by the IoT enabled device to perform actions corresponding to the at least one gesture ID.

14. The method of claim 12, further comprising recalibrating the AR-enabled eyewear device by processing camera frames from the camera, detecting the IoT enabled device in the camera frames, returning a bounding box of the IoT display in the camera frames, obtaining a depth map of the bounding box in the camera frames, combining the bounding box and depth map to determine a current position of the IoT display relative to the AR-enabled eyewear device in real-world coordinates, and adjusting for sensor offsets of the AR-enabled eyewear device using the determined current position of the IoT display.

15. The method of claim 12, wherein calibrating the AR-enabled eyewear device to the real-world coordinate position of the IoT display comprises detecting quick response (QR) codes displayed in at least three corners of the IoT display, obtaining three-dimensional (3D) coordinate positions of the detected QR codes from camera frame data of a camera of the AR enabled eyewear device and inertial measurement unit (IMU) data from an IMU of the AR-enabled eyewear device, and determining from the 3D coordinate positions a position of the IoT display in real-world coordinates.

16. The method of claim 12, wherein determining the intersection point of the FOV of the AR-enabled eyewear device with the IoT display comprises tracking a position of the IoT display relative to the AR-enabled eyewear device in real-world coordinates and using raycasting to determine the intersection point of the FOV of the AR-enabled eyewear device with the tracked position of the IoT display.

17. The method of claim 12, further comprising sending cursor position updates to the IOT enabled device as a user of the AR-enabled eyewear device moves her head or moves around a room containing the IoT enabled device.

18. The method of claim 17, further comprising sending at least one of (a) a default cursor position or (b) an error message to the IoT enabled device when the intersection point of the FOV of the eyewear device with the IoT display cannot be determined.

19. A non-transitory computer-readable storage medium that stores instructions that when executed by at least one processor cause the at least one processor to remotely control an Internet of Things (IOT) enabled device having an IoT display using an augmented reality (AR)-enabled eyewear device by performing operations including:
pairing the AR-enabled eyewear device with the IoT enabled device for communications over a communications interface therebetween by configuring the eyewear device to subscribe for dynamic events including messages relating to at least one of hand gestures or head gestures on the communications interface;
calibrating the AR-enabled eyewear device to a real-world coordinate position of the IoT display;
determining an intersection point of a field of view (FOV) of the AR-enabled eyewear device with the IoT display; and
sending a cursor position update to the IoT enabled device based on the intersection point over the communications interface.

* * * * *